(12) United States Patent
Okamura

(10) Patent No.: US 7,938,725 B2
(45) Date of Patent: May 10, 2011

(54) GAME APPARATUS AND STORAGE MEDIUM STORING GAME PROGRAM

(75) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1182 days.

(21) Appl. No.: 11/600,837

(22) Filed: Nov. 17, 2006

(65) Prior Publication Data

US 2008/0076565 A1 Mar. 27, 2008

(30) Foreign Application Priority Data

Sep. 13, 2006 (JP) ................................. 2006-248720

(51) Int. Cl.
*A63F 13/00* (2006.01)
*A63F 9/24* (2006.01)
*G06F 17/00* (2006.01)
*A63F 13/10* (2006.01)

(52) U.S. Cl. .......... 463/37; 463/2; 463/3; 463/4; 463/5; 273/108.1; 273/317.1; 273/348; 273/461; 345/419; 345/473; 345/636; 345/653; 434/44

(58) Field of Classification Search ................. 463/1–5, 463/7–9, 30–34, 36–39, 40–43, 49–57; 273/108.1, 273/127 R, 148 R, 148 B, 309, 317.1, 340, 273/348, 361–367, 461; 348/14.15, 39, 42, 348/47–52, 115, 117, 121, 135–137, 141, 348/211.14, 576, 588–589, 719, 721, E13.004, 348/E13.064–E13.067; 717/168–178; 345/1.1–1.3, 345/2.1–2.3, 3.1–3.4, 24, 419, 467–469, 345/473, 539, 543–544, 625, 636, 638, 653–656, 345/664–666, 682–683, 686, 949–950, FOR. 139, 345/FOR. 153; 434/37–38, 43–44, 69, 118, 240, 256–257; 375/240.15–240.16, 240.25; A63F 13/00, 13/06, 13/10, 09/24; G06F 17/00
See application file for complete search history.

(56) References Cited

U.S. PATENT DOCUMENTS

| | | | | |
|---|---|---|---|---|
| 4,839,838 | A * | 6/1989 | LaBiche et al. | 708/141 |
| 5,181,181 | A * | 1/1993 | Glynn | 702/141 |
| 5,905,487 | A * | 5/1999 | Kwon | 345/158 |
| 5,913,727 | A * | 6/1999 | Ahdoot | 463/39 |
| 5,999,185 | A * | 12/1999 | Kato et al. | 345/420 |
| 6,041,651 | A * | 3/2000 | Naruo et al. | 73/491 |
| 6,072,467 | A * | 6/2000 | Walker | 345/157 |
| 6,375,572 | B1 * | 4/2002 | Masuyama et al. | 463/43 |
| 6,471,586 | B1 * | 10/2002 | Aiki et al. | 463/6 |

(Continued)

FOREIGN PATENT DOCUMENTS

JP 11-014395 1/1999

(Continued)

*Primary Examiner* — Arthur O. Hall
(74) *Attorney, Agent, or Firm* — Nixon & Vanderhye P.C.

(57) ABSTRACT

Operation data is obtained from an input device and is stored into a memory, and initial state data indicating an attitude or a position of an object in a virtual game world is calculated with predetermined start timing using acceleration data included in the obtained operation data. Depending on acceleration data included in operation data sequentially obtained on and after the start timing, change amount data for sequentially changing the attitude or position of the object over time is calculated. Thereafter, the attitude or position of the object disposed in the virtual game world, depending on the initial state data, is changed, depending on the change amount data, to perform a game process of controlling a motion of the object.

20 Claims, 22 Drawing Sheets

U.S. PATENT DOCUMENTS

| | | | |
|---|---|---|---|
| 6,520,858 B2 * | 2/2003 | Matsui et al. | 463/43 |
| 6,545,661 B1 * | 4/2003 | Goschy et al. | 345/158 |
| 6,834,249 B2 * | 12/2004 | Orchard | 702/141 |
| 6,908,386 B2 * | 6/2005 | Suzuki et al. | 463/30 |
| 6,908,388 B2 * | 6/2005 | Shimizu et al. | 463/31 |
| 6,921,332 B2 * | 7/2005 | Fukunaga et al. | 463/8 |
| 6,933,923 B2 * | 8/2005 | Feinstein | 345/158 |
| 7,683,883 B2 * | 3/2010 | Touma et al. | 345/163 |
| 2003/0057808 A1 | 3/2003 | Lee et al. | |
| 2003/0207704 A1 * | 11/2003 | Takahashi et al. | 463/1 |
| 2003/0222851 A1 | 12/2003 | Lai et al. | |
| 2004/0147317 A1 | 7/2004 | Ito et al. | |
| 2004/0219981 A1 * | 11/2004 | Bando | 463/35 |
| 2004/0252109 A1 | 12/2004 | Trent et al. | |
| 2005/0070359 A1 | 3/2005 | Rodriquez et al. | |
| 2005/0134555 A1 | 6/2005 | Liao | |
| 2006/0094480 A1 * | 5/2006 | Tanaka | 455/575.1 |
| 2006/0094502 A1 | 5/2006 | Katayama et al. | |
| 2006/0123146 A1 | 6/2006 | Wu et al. | |
| 2006/0129951 A1 * | 6/2006 | Vaananen et al. | 715/864 |
| 2006/0231794 A1 | 10/2006 | Sakaguchi et al. | |
| 2006/0252477 A1 | 11/2006 | Zalewski et al. | |
| 2006/0264260 A1 * | 11/2006 | Zalewski et al. | 463/36 |
| 2006/0282873 A1 * | 12/2006 | Zalewski et al. | 725/133 |
| 2006/0287086 A1 * | 12/2006 | Zalewski et al. | 463/37 |
| 2006/0287087 A1 * | 12/2006 | Zalewski et al. | 463/37 |
| 2007/0015558 A1 * | 1/2007 | Zalewski et al. | 463/1 |
| 2007/0015588 A1 | 1/2007 | Matsumoto et al. | |
| 2007/0021208 A1 * | 1/2007 | Mao et al. | 463/36 |
| 2007/0265075 A1 * | 11/2007 | Zalewski | 463/36 |

FOREIGN PATENT DOCUMENTS

| | | |
|---|---|---|
| JP | 2001-104643 A | 4/2001 |
| JP | 2001-306245 A | 11/2001 |

* cited by examiner

F I G. 1 8
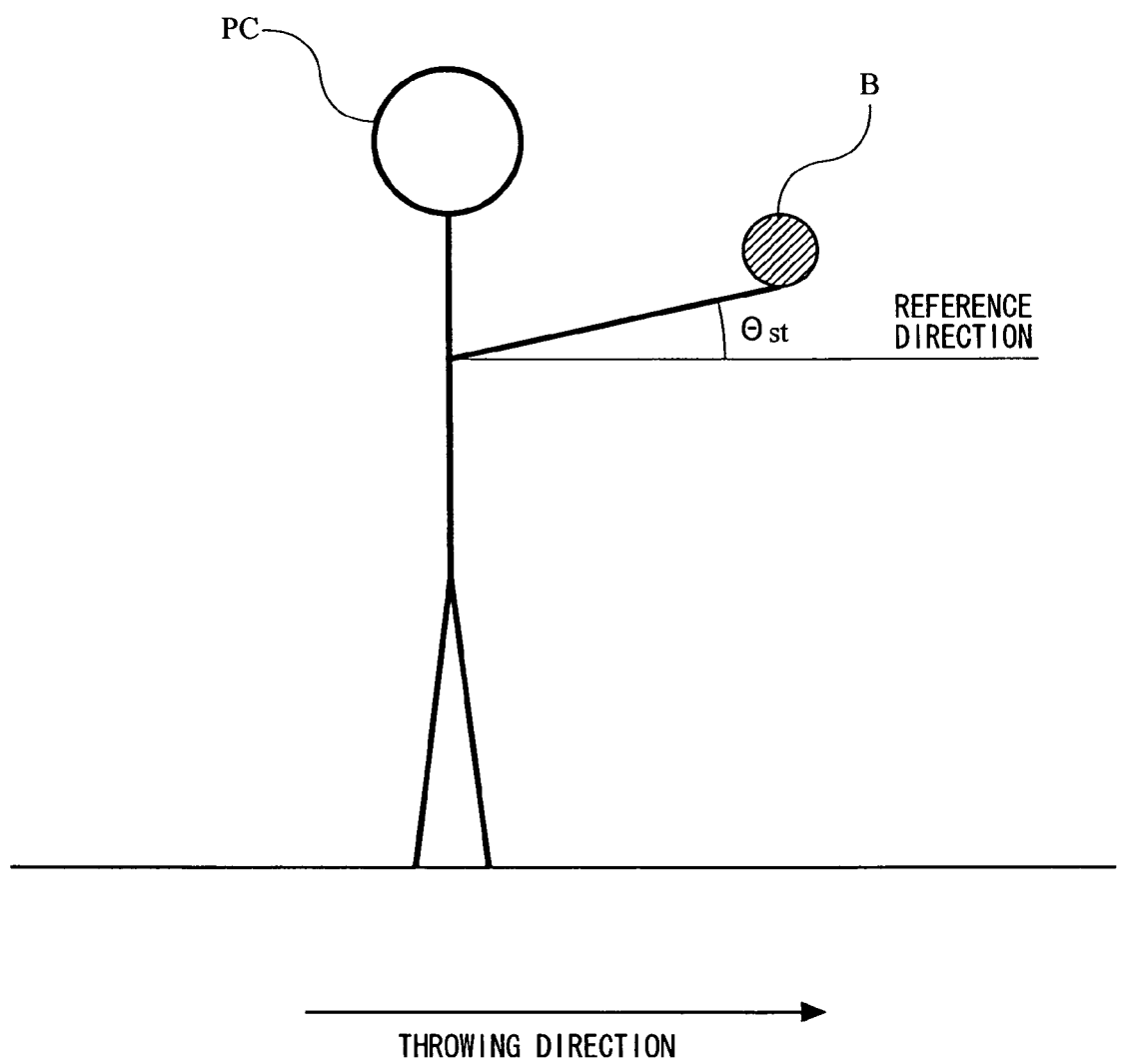

F I G. 1 9
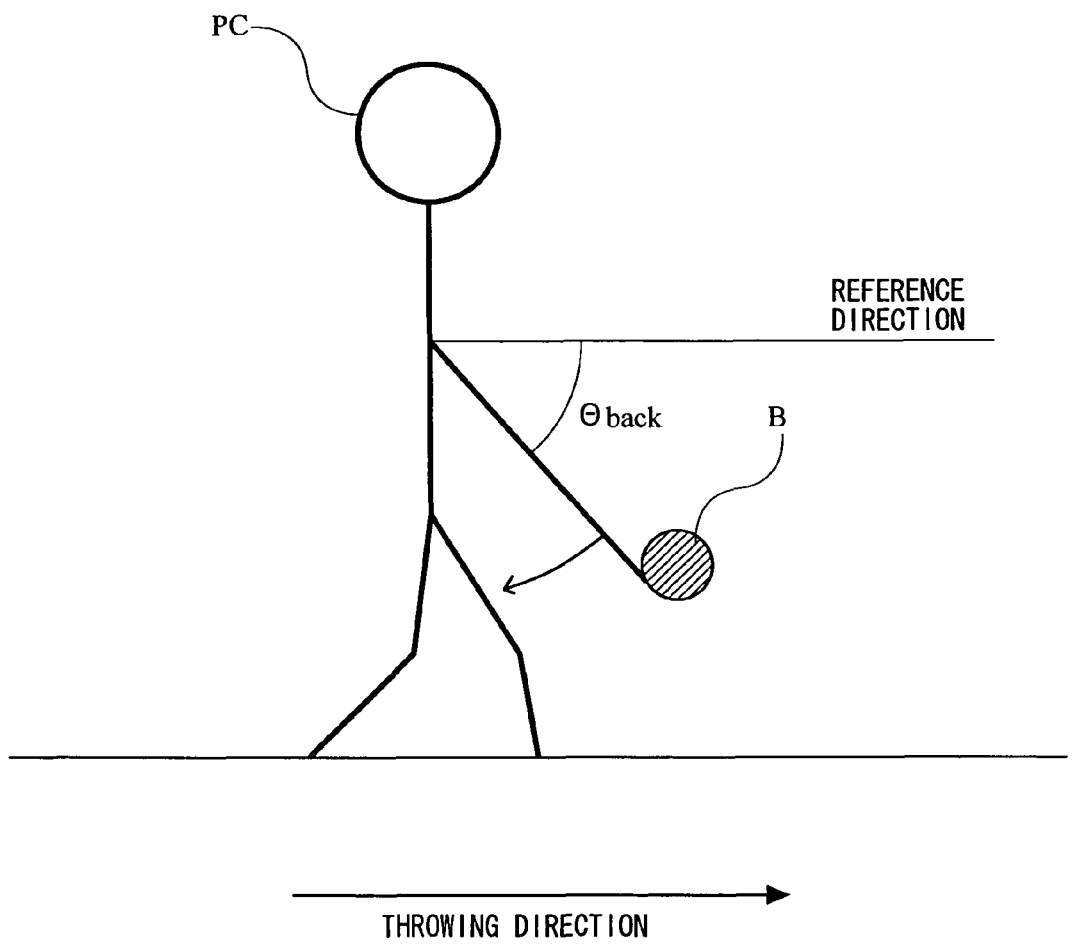

F I G. 2 2
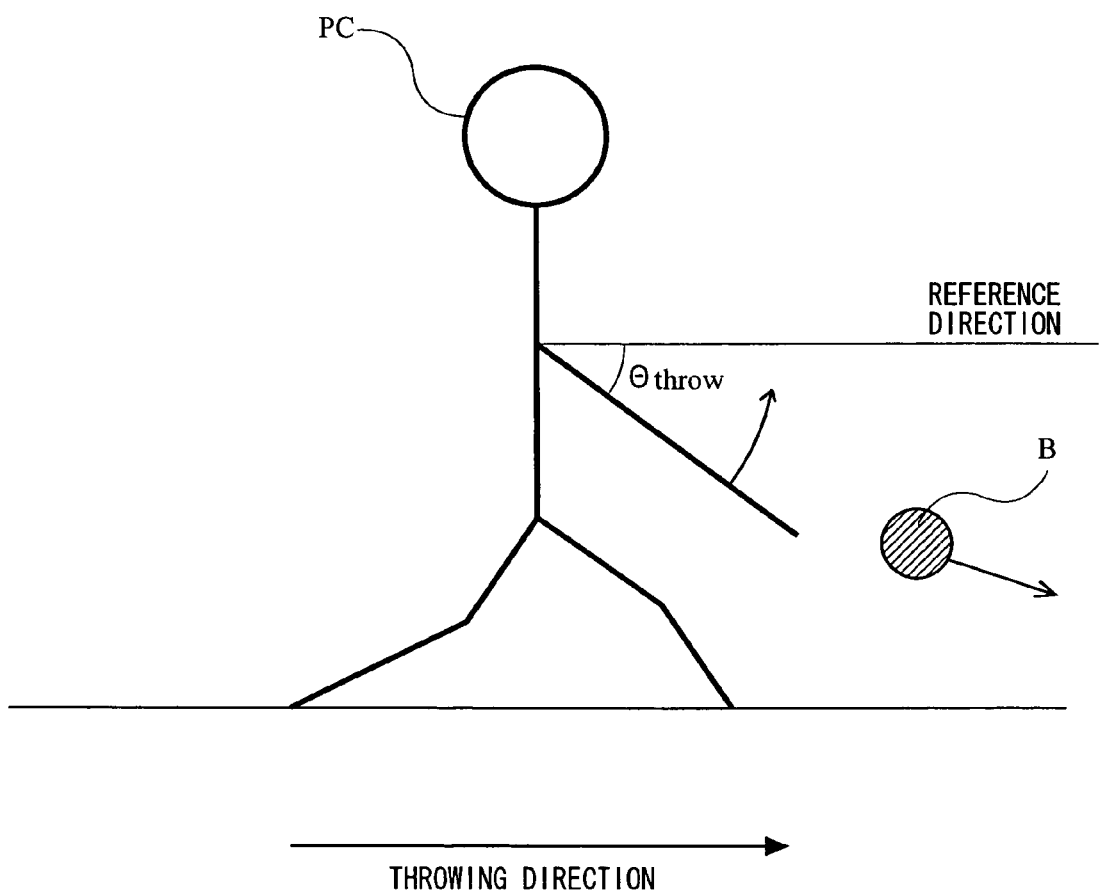

GAME APPARATUS AND STORAGE MEDIUM STORING GAME PROGRAM

CROSS REFERENCE TO RELATED APPLICATION

The disclosure of Japanese Patent Application No. 2006-248720, filed Sep. 13, 2006, is incorporated herein by reference.

BACKGROUND

1. Field of the Technology

The technology presented herein relates to a game apparatus and a storage medium storing a game program. More particularly, the present technology relates to a game apparatus which is operated by swinging an input device comprising an acceleration sensor, and a storage medium storing a game program.

2. Description of the Background Art

Conventionally, there is an apparatus which estimates a motion of a player's body. For example, Japanese Laid-Open Patent Publication No. 11-14395 (hereinafter referred to as Patent Document 1) discloses a movement data estimating apparatus for estimating the speed of a thrown ball when a player performs a throwing motion. The movement data estimating apparatus is a watch apparatus comprising an electronic circuit, an acceleration sensor, and two tilt switches. The movement data estimating apparatus, which is attached to a player's arm, estimates the speed of a thrown ball when a player performs a throwing motion. When a tilt switch has been in the ON state for a predetermined period of time, the movement data estimating apparatus determines a dominant hand of the player, depending on which of the tilt switches is in the ON state, and starts detection of an acceleration using the acceleration sensor. The acceleration sensor detects the absolute value of an acceleration occurring in the main body of the apparatus. The movement data estimating apparatus calculates an integral of the acceleration, and estimates the speed of a thrown ball based on the integral of the acceleration using an approximate expression indicating a relationship between acceleration integrals and actual speeds of the thrown ball as an estimation expression.

However, in the movement data estimating apparatus disclosed in Patent Document 1, since the value of the acceleration occurring in the main body of the apparatus changes significantly during a player's throwing motion, the tilt switches are provided in addition to the acceleration sensor so as to start measurement of the acceleration. Therefore, the cost of parts of the movement data estimating apparatus increases. Also, in the movement data estimating apparatus, since the integral is used to estimate the speed of a thrown ball, only an approximate speed of the thrown ball can be calculated, and a throwing direction or the like other than the speed cannot be estimated. Therefore, the movement data estimating apparatus estimates only the speed of a thrown ball, likely leading to the lack of enjoyment for the player. Also, the movement data estimating apparatus uses the integral so as to estimate the speed of a thrown ball, so that the motion cannot be estimated until the integration process is finished. Therefore, the movement data estimating apparatus cannot perform a process of reflecting a player's motion (e.g., throwing, etc.) in real time.

SUMMARY

Therefore, the present technology is provided. A feature of the present technology is to provide a novel game apparatus which utilizes detection of a motion using an acceleration sensor, and a storage medium storing a game program.

The present technology has the following features to attain the above. Note that reference numerals, step numbers and the like inside parentheses indicate correspondence to embodiments described below for the sake of easy understanding, and do not limit the present technology.

A first aspect of an example embodiment presented herein is directed to a game apparatus (5) for obtaining operation data including acceleration data (Da, Xa, Ya, Za) from an input device (7) comprising an acceleration sensor (701) for outputting the acceleration data, and based on the operation data, performing a game process, depending on an operation of swinging the input device. The apparatus comprises an operation data obtaining means (a CPU 30 for executing steps 20, 26, 51 and 61, hereinafter only steps are simply described), an initial state data calculating means (S11), a change amount data calculating means (S52, S53, S62, S63), and a game processing means (S17, S24, S54, S64). The operation data obtaining means obtains the operation data from the input device and stores the operation data into a storage means (33). The initial state data calculating means calculates initial state data ($\Theta$st) indicating an attitude or a position of an object (PC, B) in a virtual game world using the acceleration data included in the operation data obtained with predetermined start timing (Yes in S25). The change amount data calculating means calculates change amount data ($\Theta$back, $\Theta$for, ($\Theta$throw)) for sequentially changing the attitude or position of the object over time, depending on the acceleration data included in the operation data sequentially obtained on and after the start timing. The game processing means changes the attitude or position of the object, depending on the change amount data, the object being provided in the virtual game world, depending on the initial state data, to control a motion of the object.

In a second aspect, the storage means stores basic motion data (Dh) indicating a series of motions of the object in the virtual game world. The change amount data calculating means calculates the change amount data ($\Theta$back, $\Theta$for) designating the attitude or position of the object during the series of motions indicated by the basic motion data, depending on magnitudes (a) of accelerations indicated by the acceleration data sequentially obtained. The game processing means causes the object to move in accordance with the motions of the basic motion data based on the change amount data, starting from the attitude or position depending on the initial state data (S24, S54, S64, FIGS. 18 to 22).

In a third aspect, the storage means stores basic motion data indicating a series of motions of the object in the virtual game world. The change amount data calculating means calculates the change amount data designating a speed ($\theta$, etc.) with which the series of motions indicated by the basic motion data are changed, depending on magnitudes of accelerations indicated by the acceleration data sequentially obtained. The game processing means reproduces the basic motion data, depending on the speed based on the change amount data, starting from the attitude or position depending on the initial state data.

In a fourth aspect, the game apparatus further comprises a timing detecting means for detecting timing (Yes in S15) with which the operation data indicating a content of a predetermined operation is obtained, on and after the start timing. The change amount data calculating means calculates the change amount data until the timing detecting means detects the timing with which the operation data indicating the content of the predetermined operation is obtained.

In a fifth aspect, the input device comprises at least one operation key (72). The operation data includes key data depending on pushing down of the operation key. The timing detecting means detects timing with which the operation key is pushed down or timing with which pushing down of the operation key is released, based on the key data.

In a sixth aspect, the game apparatus further comprises a timing detecting means for detecting timing (Yest in S15) with which the operation data indicating a content of a predetermined operation is obtained, on and after the start timing. The game processing means sets at least a direction (Θthrow) in the virtual game world with respect to the object, based on the change amount data (Θfor) calculated when the timing detecting means detects the timing with which the operation data indicating the content of the predetermined operation is obtained, so as to perform the game process.

In a seventh aspect, depending on a motion of the object (PC), the game processing means performs a game process of moving another object (B) in the virtual game world. The game processing means sets at least a direction in which the object moves the other object, based on the change amount data calculated when the timing detecting means detects the timing with which the operation data indicating the content of the predetermined operation is obtained, so as to perform the game process.

In an eighth aspect, the game apparatus further comprises a movement speed setting means (S18) for setting a movement speed of the other object, depending on a magnitude of an acceleration indicated by the acceleration data obtained immediately before the timing detecting means detects the timing with which the operation data indicating the content of the predetermined operation is obtained.

In a ninth aspect, the game apparatus further comprises a trajectory setting means (S18) for setting a trajectory (degree of a curve) of the other object, depending on magnitudes of accelerations in a predetermined direction (X-axis direction) indicated by the acceleration data before and after the timing detecting means detects the timing with which the operation data indicating the content of the predetermined operation is obtained.

In a tenth aspect, the input device comprises at least one operation key (72). The operation data includes key data depending on pushing down of the operation key. The timing detecting means detects timing with which the operation key is pushed down or timing with which pushing down of the operation key is released, based on the key data.

In an eleventh aspect, the initial state data calculating means includes a determination means (S21, S27), an acceleration direction calculating means (S22, S28), and a corresponding state calculating means (S24, S29). The determination means determines whether or not an acceleration indicated by the acceleration data is stable. The acceleration direction calculating means calculates a direction in which the acceleration acts on the input device when the determination means determines that the acceleration is stable. The corresponding state calculating means calculates the attitude or position (Θst) of the object in the virtual game world corresponding to the direction in which the acceleration acts.

In a twelfth aspect, the input device comprises at least one operation key. The operation data includes key data depending on pushing down of the operation key. The game apparatus further comprises a first timing detecting means (S25), a second timing detecting means (S42, S44, S46, S47), and a third timing detecting means (S15). The first timing detecting means detects first timing with which the operation key is pushed down, based on the key data. The second timing detecting means detects second timing with which a magnitude of an acceleration indicated by the acceleration data sequentially obtained satisfies a predetermined condition, on and after the first timing. The third timing detecting means detects third timing with which pushing down of the operation key is released, based on the key data, on and after the second timing. The initial state data calculating means calculates the initial state data (Θst) using the acceleration data included in the operation data obtained with the first timing. The change amount data calculating means includes a first change amount data calculating means (S53) and a second change amount data calculating means (S63). The first change amount data calculating means calculates first change amount data (Θback) for sequentially changing the attitude or position of the object over time so that the object performs a first motion (backswing), depending on the acceleration data included in the operation data sequentially obtained from the first timing to the second timing. The second change amount data calculating means calculates second change amount data (Θfor) for sequentially changing the attitude or position of the object over time so that the object performs a second motion (forward swing) different from the first motion, depending on the acceleration data included in the operation data sequentially obtained on and after the second timing. The game processing means performs a game process of controlling a motion (Θthrow) of the object, depending on the second change amount data calculated with the third timing.

A thirteenth aspect is directed to a storage medium storing a game program executed by a computer (30) in a game apparatus for obtaining operation data including acceleration data from an input device comprising an acceleration sensor for outputting the acceleration data, and based on the operation data, performing a game process, depending on an operation of swinging the input device. The game program causing the computer to execute an operation data obtaining step, an initial state data calculating step, a change amount data calculating step, and a game processing step. The operation data obtaining step obtains the operation data from the input device and stores the operation data into a memory (33). The initial state data calculating step calculates initial state data indicating an attitude or a position of an object in a virtual game world using the acceleration data included in the operation data obtained with predetermined start timing. The change amount data calculating step calculates change amount data for sequentially changing the attitude or position of the object over time, depending on the acceleration data included in the operation data sequentially obtained on and after the start timing. The game processing step changes the attitude or position of the object, depending on the change amount data, the object being provided in the virtual game world, depending on the initial state data, to control a motion of the object.

In a fourteenth aspect, the memory stores basic motion data indicating a series of motions of the object in the virtual game world. The change amount data calculating step calculates the change amount data designating the attitude or position of the object during the series of motions indicated by the basic motion data, depending on a magnitude of an acceleration indicated by the acceleration data sequentially obtained. The game processing step causes the object to move in accordance with the motions of the basic motion data based on the change amount data, starting from the attitude or position depending on the initial state data.

In a fifteenth aspect, the memory stores basic motion data indicating a series of motions of the object in the virtual game world. The change amount data calculating step calculates the change amount data designating a speed with which the series of motions indicated by the basic motion data are changed, depending on a magnitude of an acceleration indicated by the acceleration data sequentially obtained. The game processing step reproduces the basic motion data, depending on the speed based on the change amount data, starting from the attitude or position depending on the initial state data.

In a sixteenth aspect, the game program causes the computer to further execute a timing detecting step of detecting timing with which the operation data indicating a content of a predetermined operation is obtained, on and after the start timing. The change amount data calculating step calculates the change amount data until the timing detecting step detects the timing with which the operation data indicating the content of the predetermined operation is obtained.

In a seventeenth aspect, the input device comprises at least one operation key. The operation data includes key data depending on pushing down of the operation key. The timing detecting step detects timing with which the operation key is pushed down or timing with which pushing down of the operation key is released, based on the key data.

In an eighteenth aspect, the game program causes the computer to further execute a timing detecting step of detecting timing with which the operation data indicating a content of a predetermined operation is obtained, on and after the start timing. The game processing step sets at least a direction in the virtual game world with respect to the object, based on the change amount data calculated when the timing detecting step detects the timing with which the operation data indicating the content of the predetermined operation is obtained, so as to perform the game process.

In a nineteenth aspect, depending on a motion of the object, the game processing step performs a game process of moving another object in the virtual game world. The game processing step sets at least a direction in which the object moves the other object, based on the change amount data calculated when the timing detecting step detects the timing with which the operation data indicating the content of the predetermined operation is obtained, so as to perform the game process.

In a twentieth aspect, the game program causes the computer to further execute a movement speed setting step of setting a movement speed of the other object, depending on a magnitude of an acceleration indicated by the acceleration data obtained immediately before the timing detecting step detects the timing with which the operation data indicating the content of the predetermined operation is obtained.

In twenty-first aspect, the game program causes the computer to further execute a trajectory setting step of setting a trajectory of the other object, depending on magnitudes of accelerations in a predetermined direction indicated by the acceleration data before and after the timing detecting step detects the timing with which the operation data indicating the content of the predetermined operation is obtained.

In a twenty-second aspect, the input device comprises at least one operation key. The operation data includes key data depending on pushing down of the operation key. The timing detecting step detects timing with which the operation key is pushed down or timing with which pushing down of the operation key is released, based on the key data.

In a twenty-third aspect, the initial state data calculating step includes a determination step, an acceleration direction calculating, and a corresponding state calculating step. The determination step determines whether or not an acceleration indicated by the acceleration data is stable. The acceleration direction calculating step calculates a direction in which the acceleration acts on the input device when the determination step determines that the acceleration is stable. The corresponding state calculating step calculates the attitude or position of the object in the virtual game world corresponding to the direction in which the acceleration acts.

In a twenty-fourth aspect, the input device comprises at least one operation key. The operation data includes key data depending on pushing down of the operation key. The game program causes the computer to further execute a first timing detecting step, a second timing detecting step, and a third timing detecting step. The first timing detecting step detects first timing with which the operation key is pushed down, based on the key data. The second timing detecting step detects second timing with which a magnitude of an acceleration indicated by the acceleration data sequentially obtained satisfies a predetermined condition, on and after the first timing. The third timing detecting step detects third timing with which pushing down of the operation key is released, based on the key data, on and after the second timing. The initial state data calculating step calculates the initial state data using the acceleration data included in the operation data obtained with the first timing. The change amount data calculating step includes a first change amount data calculating step and a second change amount data calculating step. The first change amount data calculating step calculates first change amount data for sequentially changing the attitude or position of the object over time so that the object performs a first motion, depending on the acceleration data included in the operation data sequentially obtained from the first timing to the second timing. The second change amount data calculating step calculates second change amount data for sequentially changing the attitude or position of the object over time so that the object performs a second motion different from the first motion, depending on the acceleration data included in the operation data sequentially obtained on and after the second timing. The game processing step performs a game process of controlling a motion of the object, depending on the second change amount data calculated with the third timing.

According to the first aspect, it is possible to provide a novel game which sequentially reflects changes in acceleration detected by the acceleration sensor, depending on a motion of the player swinging the input device.

According to the second and third aspects, it is possible to cause the object to move, sequentially reflecting accelerations, based on state data which sequentially reflects the acceleration which changes over time, depending on the swing motion of the player.

According to the fourth aspect, it is possible to provide a novel game which sequentially reflects changes in acceleration detected by the acceleration sensor during a predetermined period of time, depending on a motion of the player swinging the input device.

According to the fifth and tenth aspects, it is possible to set the period of time during which changes in acceleration are sequentially reflected, depending on a player's key operation.

According to the sixth aspect, it is possible to provide a new game process which reflects a direction obtained by sequentially obtaining accelerations detected by the acceleration sensor, depending on a motion of the player swinging the input device. For example, it is possible to estimate a swing angle of the input device at a predetermined time point using an accumulation of accelerations indicated by acceleration data, thereby making it possible to achieve a novel game which reflects a swing angle of the input device.

According to the seventh aspect, it is possible to provide a novel game in which the object is moved in a direction obtained by sequentially obtaining the accelerations.

According to the eighth aspect, it is possible to set a speed of the object moving a direction obtained by sequentially obtaining the accelerations, depending on a motion of the player swinging the input device.

According to the ninth aspect, it is possible to set a trajectory of the object moving a direction obtained by sequentially obtaining the accelerations, depending on a motion of the player swinging the input device.

According to the eleventh aspect, it is possible to set an initial state of the object in the virtual game world, corresponding to an attitude of the input device.

According to the twelfth aspect, it is possible to provide a novel game in which changes in acceleration detected by the acceleration sensor, depending on a motion of the player swinging the input device are sequentially reflected, and a motion of the object is changed during the course of the changes.

According to the storage medium storing the game program of the present embodiment, effects similar to those of the game apparatus can be obtained.

These and other features, aspects and advantages of the present technology will become more apparent from the following detailed description of the present technology when taken in conjunction with the accompanying drawings.

BRIEF DESCRIPTION OF THE DRAWINGS

FIG. 18 is a diagram illustrating an exemplary initial state of a player character PC holding the ball B at a swing angle Θst before backswing;

FIG. 19 is a diagram illustrating an exemplary motion of the player character PC performing backswing at a swing angle Θback;

FIG. 22 is a diagram illustrating an exemplary motion of the player character PC releasing the ball B at a swing angle Θthrow.

DESCRIPTION OF THE PREFERRED EMBODIMENTS

Figure 1:
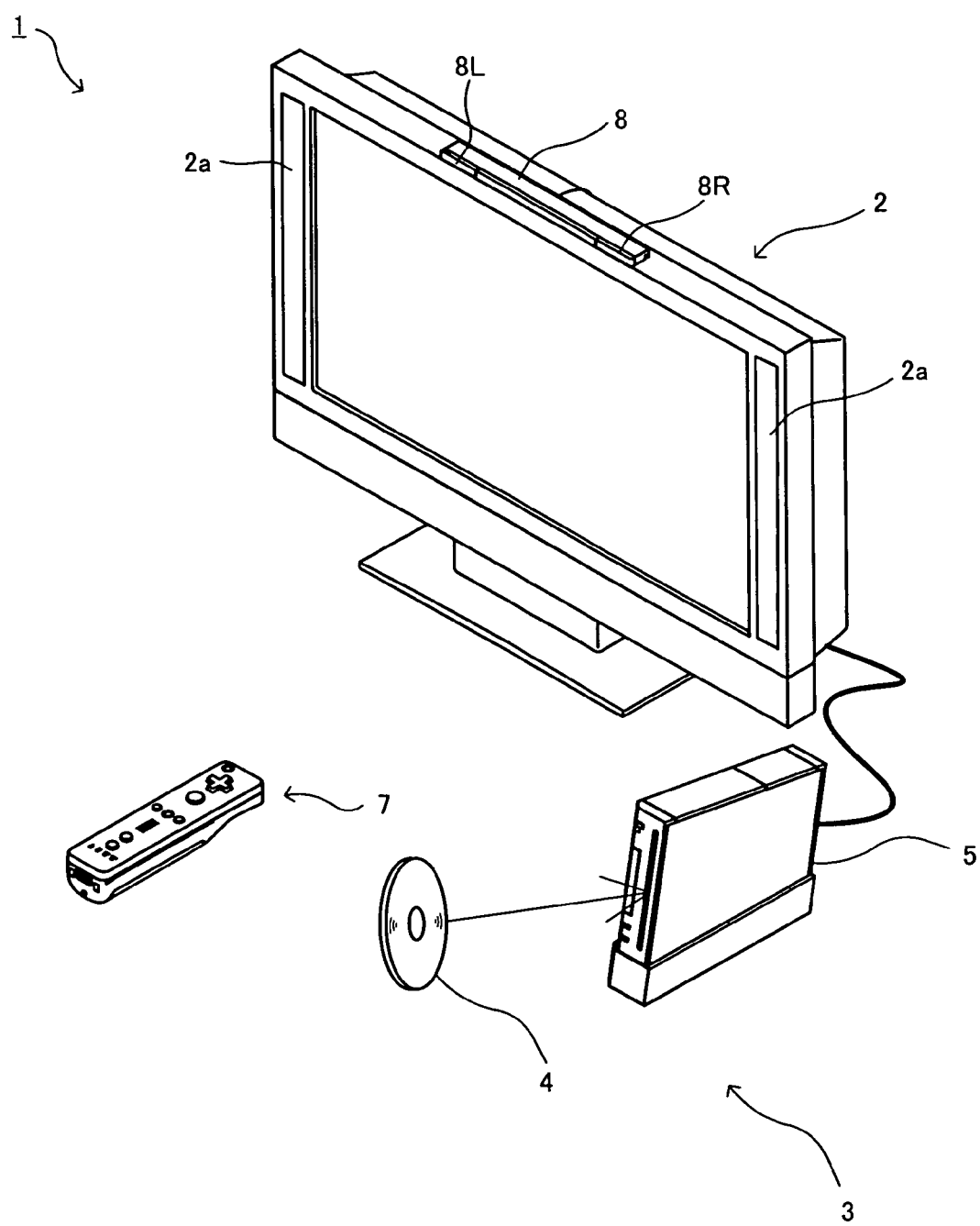
FIG. 1 is an external view of a game system 1 according to an embodiment.
Figure 2:
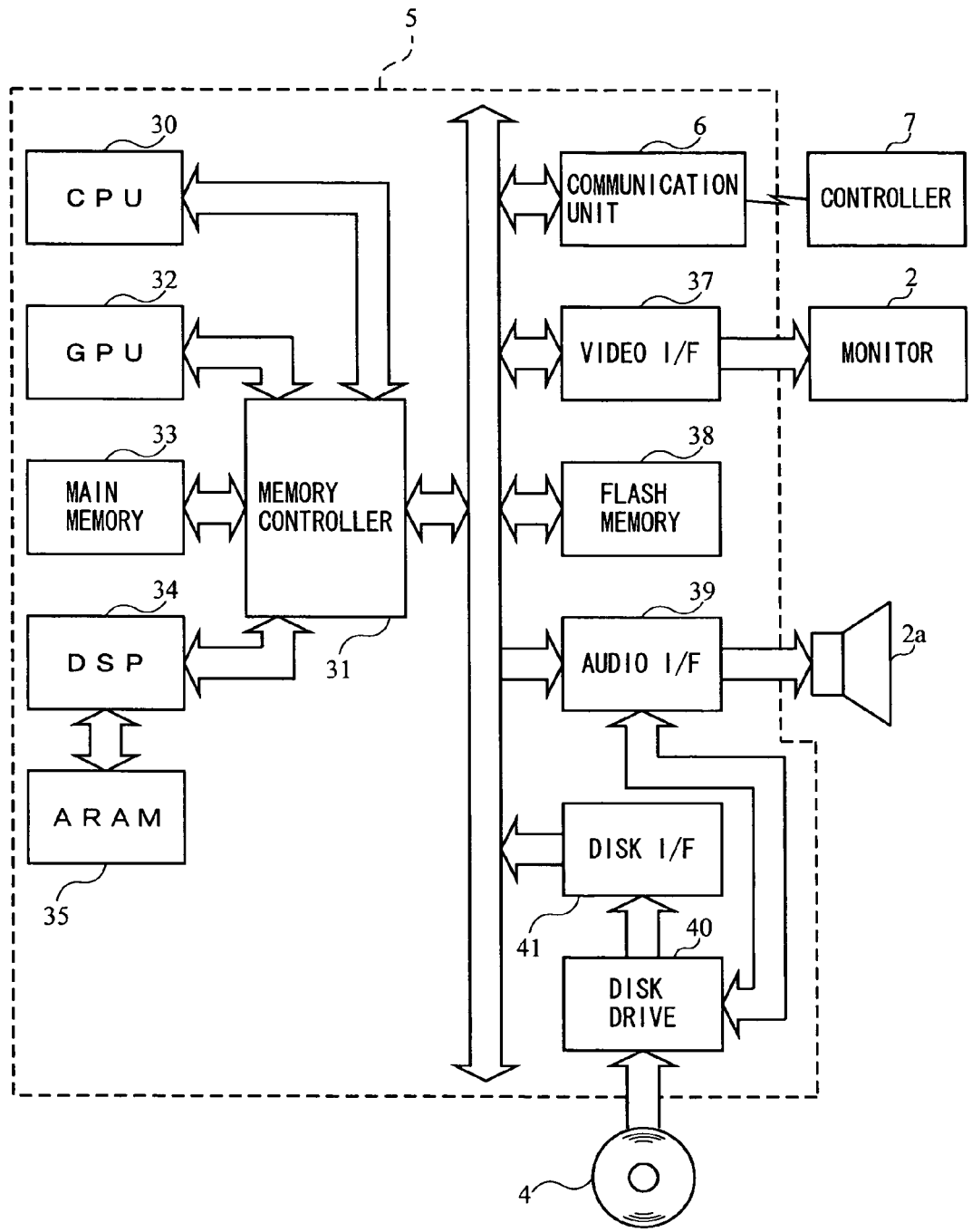
FIG. 2 is a functional block diagram of a main body 5 of a game apparatus of FIG. 1.

A game apparatus according to an embodiment will be described with reference to FIG. 1. Hereinafter, in order to specifically describe the present embodiment, a game system including a stationary game apparatus as an example of the game apparatus will be described. Note that FIG. 1 is an external view of a game system 1 including a stationary game apparatus 3, and FIG. 2 is a block diagram of a main body 5 of the game apparatus. Hereinafter, the game system 1 will be described.

In FIG. 1, the game system 1 is composed of a television set for home use (hereinafter referred to as a monitor) 2 as an exemplary display means, and the stationary game apparatus 3 connected to the monitor 2 via a connection code. The monitor 2 comprises a loudspeaker 2a for outputting sound based on an audio signal output from the game apparatus main body 5. The game apparatus 3 comprises an optical disc 4 which stores a game program as an exemplary information processing program of the present invention, the game apparatus main body 5 including a computer for executing the game program of the optical disc 4 and outputting and displaying a game screen on the monitor 2, and a controller 7 for inputting, to the game apparatus main body 5, operational information required for a game in which a character or the like displayed on the game screen is operated.

The game apparatus main body 5 includes a communication unit 6. The communication unit 6 receives data which is wirelessly transmitted from the controller 7, and transmits data from the game apparatus main body 5 to the controller 7, i.e., connects the controller 7 and the game apparatus main body 5 via wireless communication. The optical disc 4 which is an exemplary information storing medium changeable with respect to the game apparatus main body 5 is detachably attached to the game apparatus main body 5. On a front major surface of the game apparatus main body 5, a power ON/OFF switch for the game apparatus main body 5, a game process reset switch, a slot through which the optical disc 4 is detached or attached, an eject switch for removing the optical disc 4 through the slot of the game apparatus main body 5, and the like are provided.

A flash memory 38 which functions as a backup memory for fixedly storing saved data or the like is provided in the game apparatus main body 5. The game apparatus main body 5 executes a game program or the like stored on the optical disc 4, and displays a result of the execution as a game image on the monitor 2. The game apparatus main body 5 can also reproduce a game state which was executed in the past, using the saved data stored in the flash memory 38, and display a game image on the monitor 2. The player of the game apparatus main body 5 can enjoy events of the game by operating the controller 7 while watching the game image displayed on the monitor 2.

The controller 7 wirelessly transmits transmission data, such as operational information or the like, to the game apparatus main body 5 including the communication unit 6 using, for example, the Bluetooth(R) technique. The controller 7 is an operation means for mainly operating a player character or the like appearing in a game space displayed on the display screen of the monitor 2. The controller 7 is provided with a housing having a size which allows the player to hold the controller 7 with one hand, and a plurality of operation buttons (including a cross key, a stick, and the like) provided and exposed on a surface of the housing. The controller 7 also comprises an image capture information computing section 74 for capturing an image viewed from the controller 7 as specifically described below. As exemplary objects whose images to be captured by the image capture information computing section 74, two LED modules (hereinafter referred to as markers) 8L and 8R are provided in the vicinity of the display screen of the monitor 2. The markers 8L and 8R each emit infrared light toward the front of the monitor 2. The controller 7 can also receive transmission data wirelessly transmitted from the communication unit 6 of the game apparatus main body 5 using a communication section 75, and generate sound or vibration depending on the transmission data.

In FIG. 2, the game apparatus main body 5 comprises, for example, a CPU (Central Processing Unit) 30 which executes various programs. The CPU 30 executes a boot program stored in a boot ROM (not shown) and performs, for example, initialization of memories, such as a main memory 33 and the like, before executing a game program stored in the optical disc 4, and performs a game process or the like corresponding to the game program. A GPU (Graphics Processing Unit) 32, the main memory 33, a DSP (Digital Signal Processor) 34, an ARAM (Audio RAM) 35, and the like are connected via a memory controller 31 to the CPU 30. The communication unit 6, a video I/F (interface) 37, the flash memory 38, an audio I/F 39, and a disk I/F 41 are connected via a predetermined bus to the memory controller 31. The monitor 2, the loudspeaker 2a, and a disk drive 40 are connected to the video I/F (interface) 37, the audio I/F 39, and the disk I/F 41, respectively.

The GPU 32 performs image processing based on a command from the CPU 30, and is composed of, for example, a semiconductor chip which performs a calculation process required for 3D graphics display. The GPU 32 performs image processing using a memory specialized for image processing (not shown) or a memory area which is a portion of the main memory 33. The GPU 32 uses these to generate game image data or movie video to be displayed on the monitor 2, and outputs the data via the memory controller 31 and the video I/F 37 to the monitor 2 as appropriate.

The main memory 33 is a memory area used in the CPU 30, and stores a game program or the like required for a process by the CPU 30 as appropriate. For example, the main memory 33 stores a game program, various data, or the like read from the optical disc 4 by the CPU 30. The game program, the various data, or the like stored in the main memory 33 are executed by the CPU 30.

The DSP 34 processes sound data or the like which is generated in the CPU 30 when a game program is executed. The ARAM 35 for storing the sound data or the like is connected to the DSP 34. The ARAM 35 is used when the DSP 34 performs a predetermined process (e.g., storage of a read-ahead game program or sound data) The DSP 34 reads sound data stored in the ARAM 35, and outputs the data via the memory controller 31 and the audio I/F 39 to the loudspeaker 2a included in the monitor 2.

The memory controller 31 performs a centralized control of data transfer. The above-described various I/Fs are connected to the memory controller 31. As described above, the communication unit 6 receives transmission data from the controller 7, and outputs the transmission data to the CPU 30. The communication unit 6 also transmits transmission data output from the CPU 30 to the communication section 75 of the controller 7. The monitor 2 is connected to the video I/F 37. The loudspeaker 2a included in the monitor 2 is connected to the audio I/F 39 so that sound data read from the ARAM 35 by the DSP 34 or sound data directly output from the disc drive 40 can be output from the loudspeaker 2a. The disc drive 40 is connected to the disc I/F 41. The disc drive 40 reads data stored at a predetermined read-out position on the optical disc 4, and outputs the data to the bus and the audio I/F 39 of the game apparatus main body 5.

Figure 3:
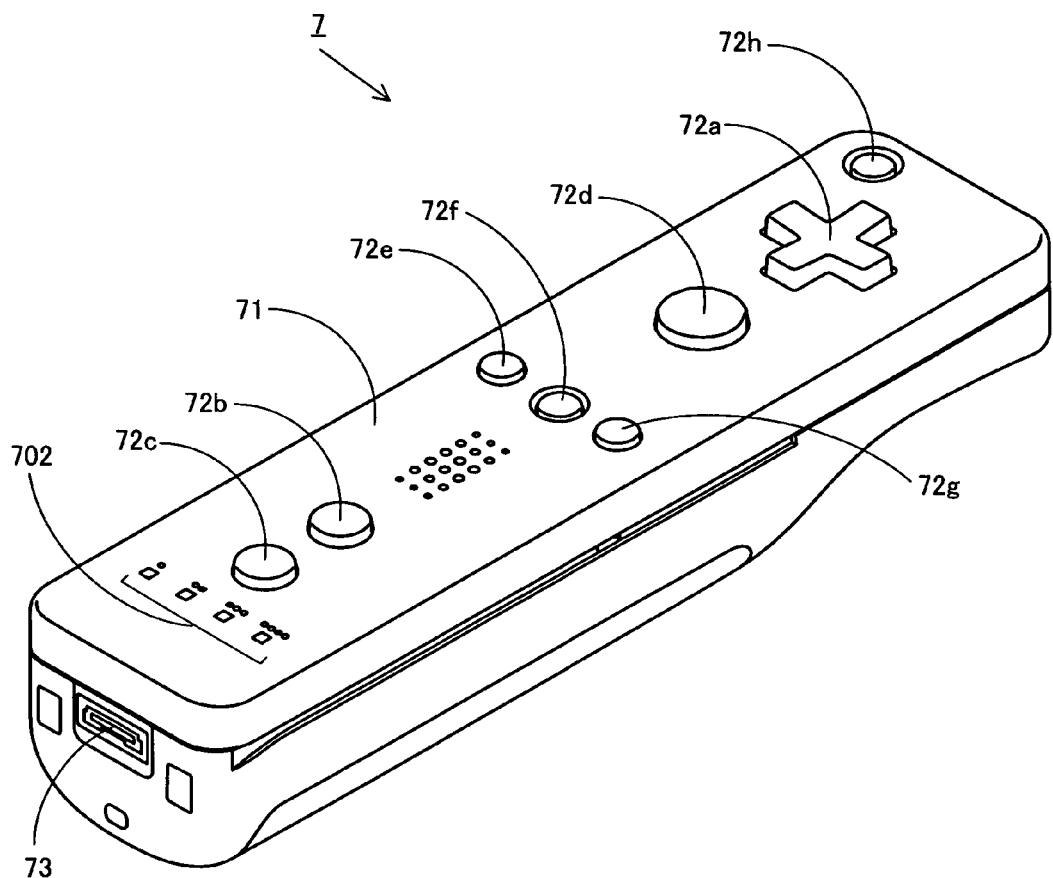
FIG. 3 is a perspective view of a controller 7 as viewed from the top and the rear.
Figure 4:
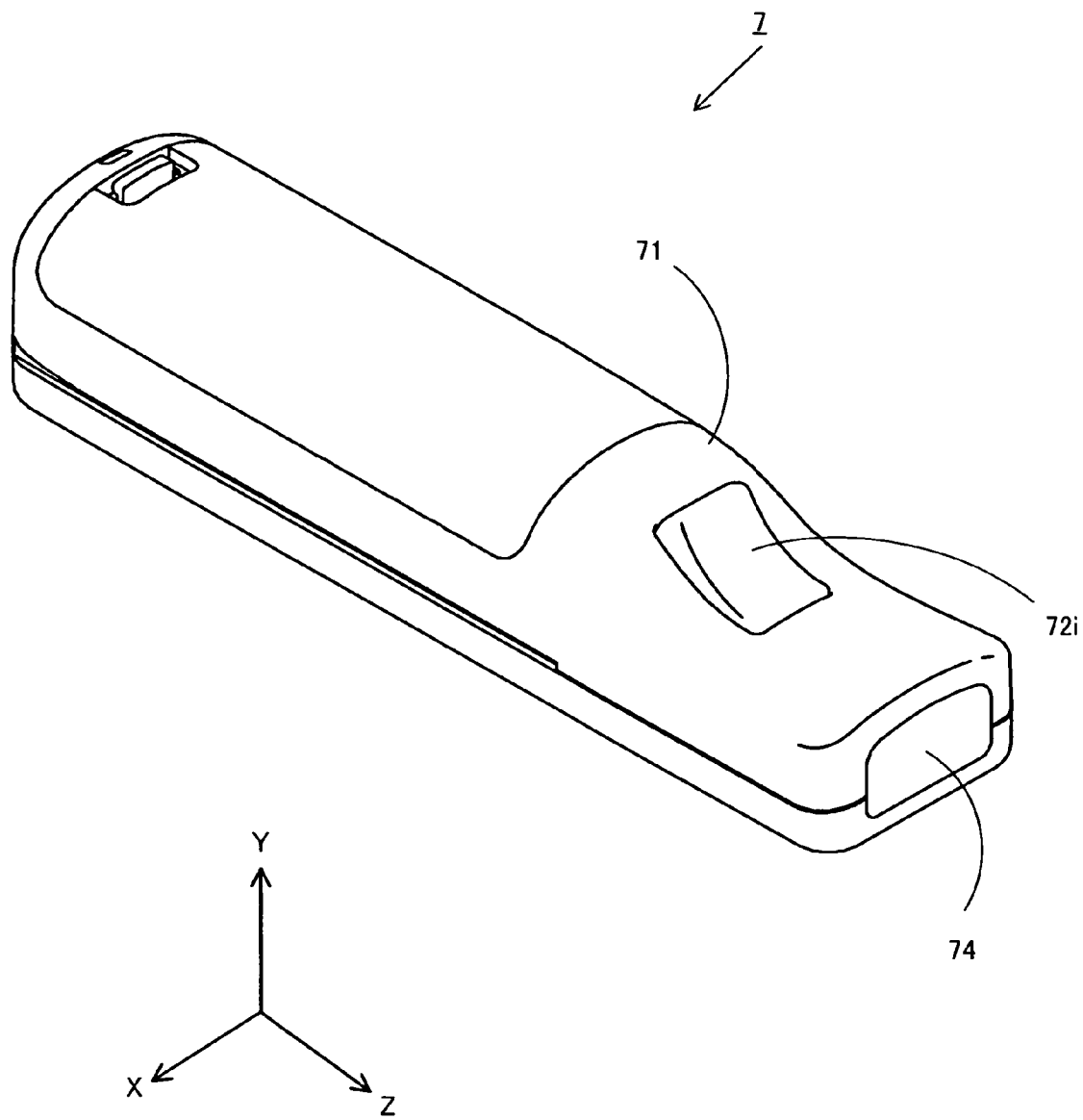
FIG. 4 is a perspective view of the controller 7 of FIG. 3 as viewed from the bottom and the front.

The controller 7 will be described with reference to FIGS. 3 and 4. Note that FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. Any of the frontward, rearward, leftward and rightward directions is selected by a player pushing down any of the operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the above-described direction input operation by a player, or may be an operation section of other embodiments. For example, an operation section may be provided in which four push switches are disposed in cross directions, and an operation signal is output, depending on a push switch pushed down by a player. In addition to the four push switches, a center switch may be provided at an intersection position of the cross directions, i.e., a complex operation section composed of the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 5. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus main body 5. The operation button 72h is also a button of the type whose upper surface is buried below the upper surface of the housing 71 so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to inform the player of controller identification currently set for the controller 7. Specifically, when transmission data is transmitted from the controller 7 to the communication unit 6, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing a front surface of the controller 7 toward the markers 8L and 8R. An operation button 72i is provided on a rear slope surface of the hollow portion. The operation button 72i is an operation section which functions as, for example, a B button. In this example, when a player performs a throwing motion, the operation button 72i is pushed down, and when a player character releases a ball, the operation button 72i.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, a 32-pin edge connector which is utilized so as to be engaged and connected with a connection cable.

Here, in order to specifically describe the present embodiment, a coordinate system which is set with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front surface (a surface on which the image capture information computing section 74 is provided) direction of the controller 7 is assumed to be the positive direction of the Z axis. A vertical direction of the controller 7 is assumed to be the Y axis, and a lower surface (a surface on which the operation button 72i is provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5:
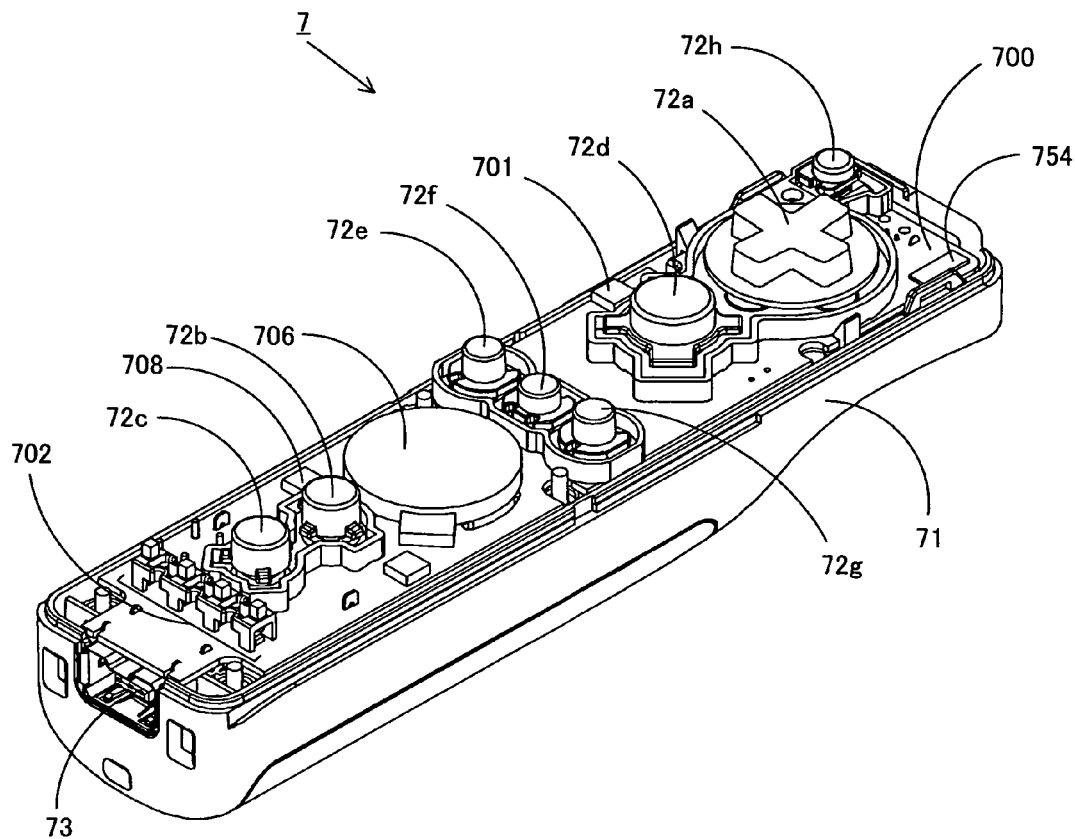
FIG. 5 is a perspective view of the controller 7 of FIG. 3 where an upper housing is cut away.
Figure 6:
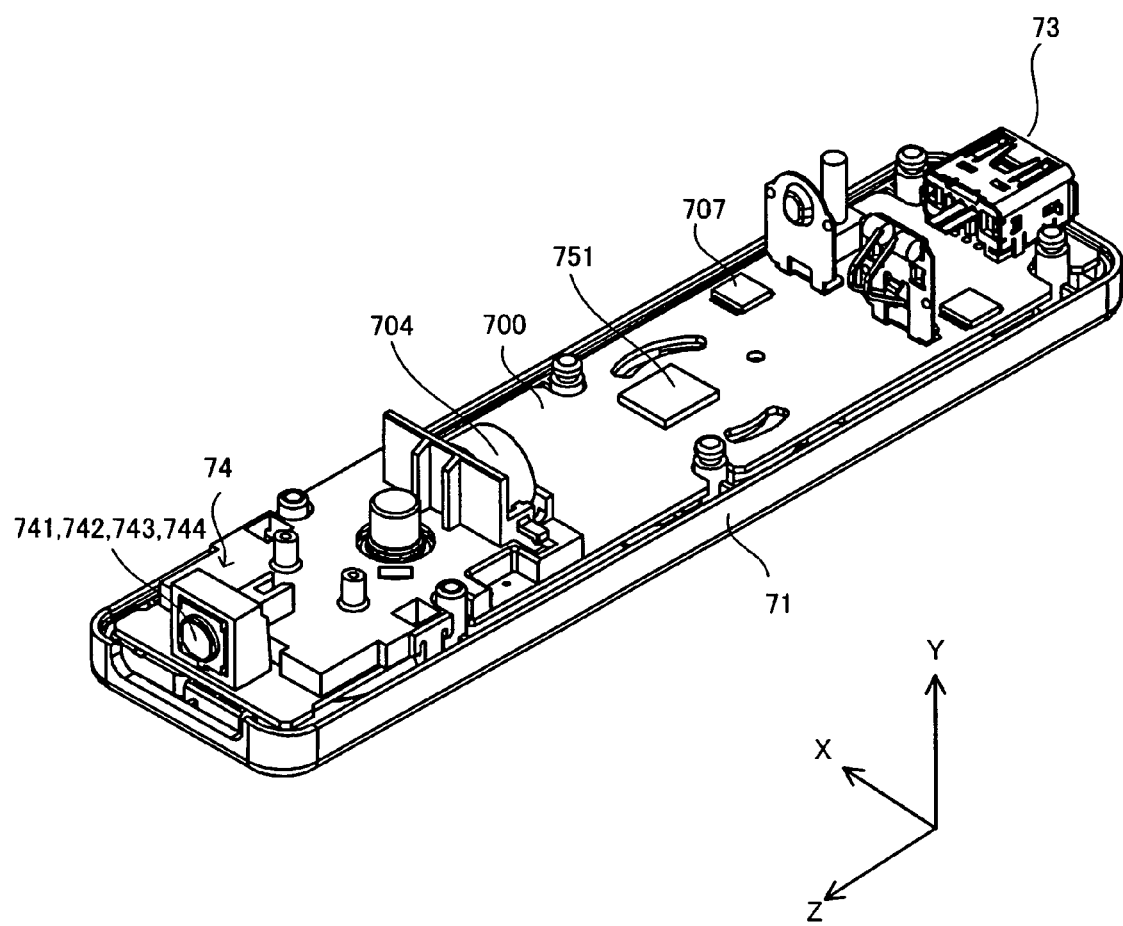
FIG. 6 is a perspective view of the controller 7 of FIG. 4 where a lower housing is cut away.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 (as viewed from a front surface side thereof) where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72a to 72h, an acceleration sensor 701, the LEDs 702, an antenna 754, and the like are provided. These are connected to a microcomputer 751 (see FIGS. 6 and 7) via a conductor (not shown) formed on the base board 700 and the like. Also, by a radio module 753 (not shown in FIG. 5, see FIG. 7) and an antenna 754, the controller 7 functions as a wireless controller. Note that a quartz oscillator 703 (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72d on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the rotation of the controller 7 can be determined based on the detected acceleration data with satisfactory sensitivity by the game apparatus main body 5 or the like.

On the other hand, in FIG. 6, the image capture information computing section 74 is provided at a front edge on a lower major surface of the base board 700. The image capture information computing section 74 is composed of an infrared filter 741, a lens 742, an image capturing element 743, and an image processing circuit 744, which are arranged in this order from the front of the controller 7, and are attached on the lower major surface of the base board 700. A connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 5.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 5. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player easily feels vibration.

Next, an internal configuration of the controller 7 will be described with reference to FIG. 7. Note that FIG. 7 is a block diagram illustrating the configuration of the controller 7.

Figure 7:
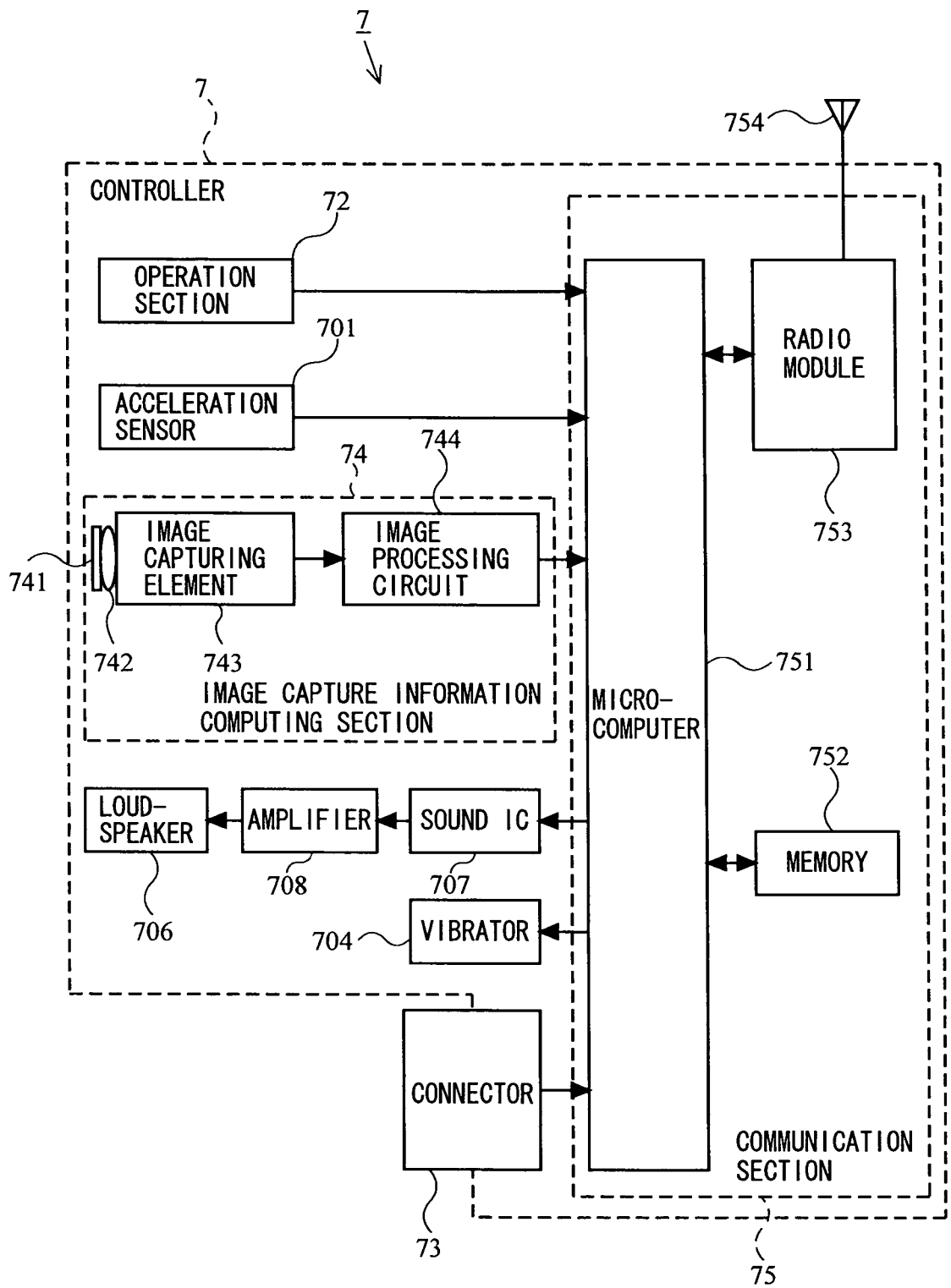
FIG. 7 is a block diagram illustrating a configuration of the controller 7 of FIG. 3.

In FIG. 7, the controller 7 comprises the communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing element 743, and the image processing circuit 744. The infrared filter 741 passes only infrared light entering from the front of the controller 7. The lens 742 collects infrared light passing through the infrared filter 741 and causes the light to enter the image capturing element 743. The image capturing element 743 may be, for example, a solid-state image capturing element, such as a CMOS sensor or a CCD, and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself.

The controller 7 preferably comprises the acceleration sensor 701 which senses accelerations along with three axes (X, Y and Z axes). The three-axis acceleration sensor 701 senses linear accelerations in three directions, i.e., a vertical direction (the Y axis of FIG. 3), a lateral direction (the X axis of FIG. 3), and a front-to-rear direction (the Z axis of FIG. 3). In other embodiments, the acceleration sensor 701 may be an acceleration detecting means which senses a linear acceleration along at least one axis, depending on the type of a control signal used in a game process. For example, the acceleration sensors 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, any of one- to three-axis acceleration sensors 701 may be provided using a technique of existing acceleration detecting means (e.g., a piezoelectric type or a piezoelectric resistance type) or other appropriate techniques which will be developed in the future.

An acceleration detecting means used as the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the three axes. Therefore, the acceleration sensor 701 cannot directly sense physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated (determined) by performing an additional process with respect to an acceleration signal output from the acceleration sensor 701. For example, when a static acceleration (gravitational acceleration) is sensed, an output from the acceleration sensor 701 is used to perform a computation using a tilt angle and the sensed acceleration, thereby making it possible to determine a tilt of a subject (the controller 7) with respect to a gravity vector. Thus, by using the acceleration sensor 701 in combination with the microcomputer 751 (or other processors, such as the CPU 30 included in the game apparatus main body 5, and the like), the tilt, attitude or position of the controller 7 can be determined. Similarly, for example, when the controller 7 comprising the acceleration sensor 701 is dynamically accelerated and moved by a player's hand, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravitational acceleration) by the acceleration sensor 701, may be for converting a sensed acceleration signal into a tilt angle corresponding thereto (or other preferable parameters). Data indicating the accelerations sensed by the acceleration sensor 701 is output to the communication section 75.

The communication section 75 comprises the microcomputer 751, a memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 5 which is received by the radio module 753 via the antenna 754. The sound IC 707 processes sound data or the like transmitted from the game apparatus main body 5 via the communication section 75. Also, the microcomputer 751 activates the vibrator 704, depending on vibration data (e.g., a signal for switching ON/OFF the vibrator 704) or the like transmitted from the game apparatus main body 5 via the communication section 75.

An operation signal (key data) from the operation section 72 provided in the controller 7, acceleration signals in the three axial directions (X-, Y- and Z-axis direction acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the communication unit 6, into the memory 752. Here, radio transmission from the communication section 75 to the communication unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the communication unit 6 arrives, the microcomputer 751 outputs transmission data stored in the memory 752, as a series of pieces of operation information, to the radio module 753. Thereafter, the radio module 753 emits the operation information, as a radio signal, from the antenna 754 using a carrier wave having a predetermined frequency by means of, for example, the Bluetooth® technique. Specifically, the key data from the operation section 72 provided in the controller 7, the X-, Y- and Z-axis direction acceleration data from the acceleration sensor 701, and the process result data from the image capture information computing section 74 are transmitted from the controller 7. Thereafter, the communication unit 6 of the game apparatus main body 5 receives the radio signal, and the game apparatus main body 5 demodulates or decodes the radio signal, thereby obtaining a series of pieces of operation information (the key data, the X-, Y- and Z-axis direction acceleration data, and the process result data). Thereafter, the CPU 30 of the game apparatus main body 5 performs a game process based on the obtained operation information and a game program. Note that, when the communication section 75 is configured using the Bluetooth® technique, the communication section 75 can also have a function of receiving transmission data wirelessly transmitted from other devices.

Figure 8:
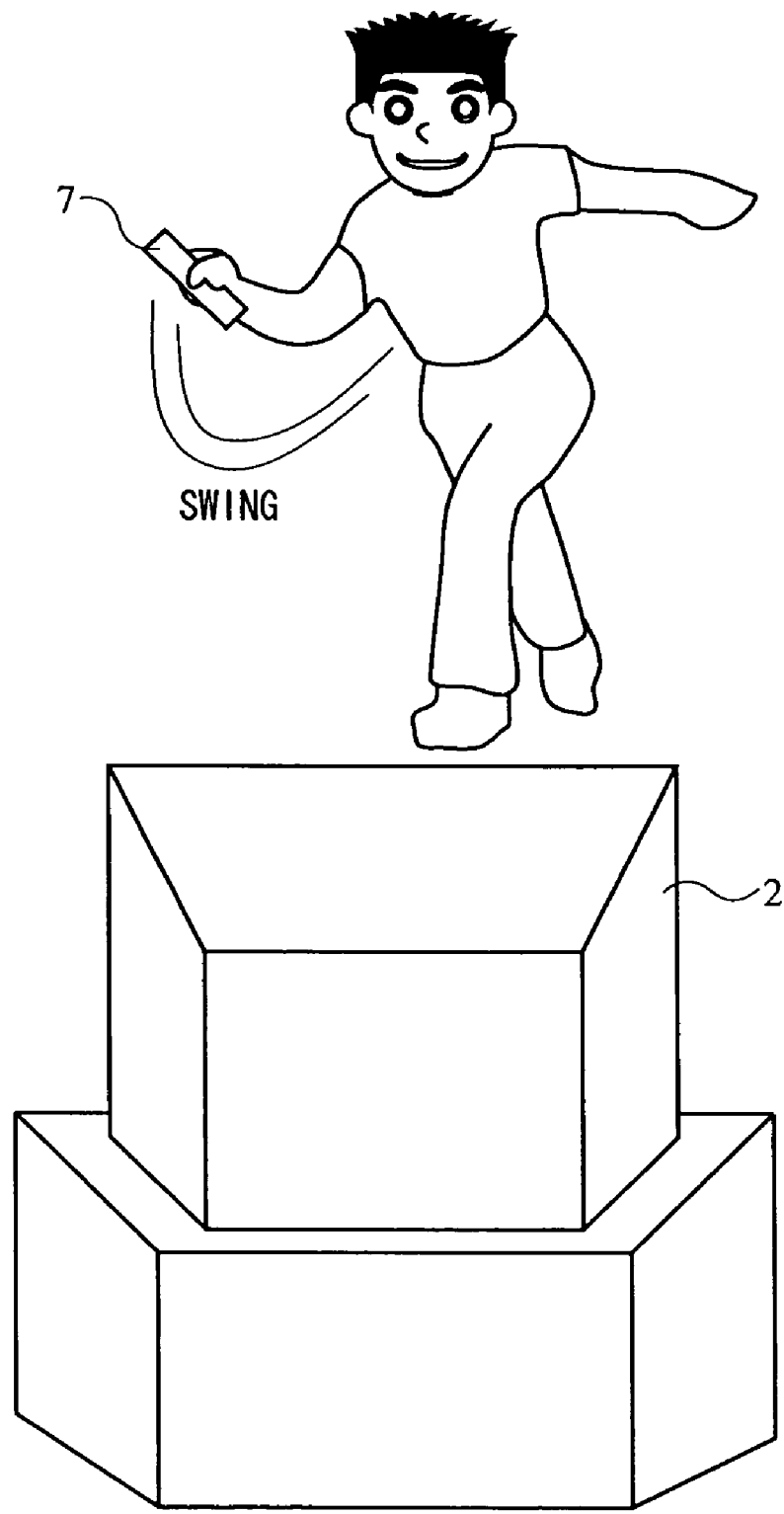
FIG. 8 is a diagram illustrating an outline of a situation where a game operation is performed using the controller 7 of FIG. 3.

Next, before describing a specific operation performed by the game apparatus main body 5, an outline of a game performed by the game apparatus main body 5 will be described. As illustrated in FIG. 8, the controller 7 has a whole size which allows an adult and a child to hold with one hand. In order to play a game using the controller 7 in the game system 1, a player holds the controller 7 with one hand, and swings the controller 7 as if the player threw a bowling ball. A bowling game is displayed on the monitor 2, depending on such a player's motion of swinging the controller 7.

Specifically, the player holds the controller 7 in a stance before throwing a ball ("address" in bowling), and thereafter, pushes down the operation button 72$i$ and performs an approach motion (a throwing motion in bowling). In response to these player's motions, a player character starts an address motion and a backswing motion on the monitor 2. Thereafter, the player holding the controller 7 performs backswing and then forward swing and releases the ball (releases the operation button 72$i$ with timing of releasing the ball). In response to these player's motions, the player character reproduces the throwing motion and releases the ball with the timing on the monitor 2.

For example, in the motion from the address until the start of backswing, the player statically tilts the controller 7 vertically, thereby inputting operational information (specifically, X-, Y- and Z-axis direction acceleration data) from the controller 7 to the game apparatus main body 5. In the motion from the backswing until the release of the ball, the player swings the controller 7, thereby inputting operational information depending on a centrifugal force or the like from the controller 7 to the game apparatus main body 5. Such a change in acceleration applied to the controller 7 can be detected by the acceleration sensor 701. Therefore, a tilt and a motion of the controller 7 can be calculated by performing an additional process with respect to the X-, Y- and Z-axis direction acceleration data output from the acceleration sensor 701. In general, when an acceleration which is generated, depending on a motion, is detected, an acceleration vector (or the sign (the positive sign or the negative sign) of the acceleration) output from the acceleration sensor 701 is exactly opposite to a direction in which the controller 7 is accelerated, and therefore, the tilt and motion of the controller 7 need to be calculated, taking the direction of the detected acceleration into consideration.

Next, a game process performed in the game system 1 will be described in detail. Firstly, main data which is used in the game process will be described with reference to FIG. 9. Note that FIG. 9 is a diagram illustrating main data which is stored in the main memory 33 of the game apparatus main body 5.

Figure 9:
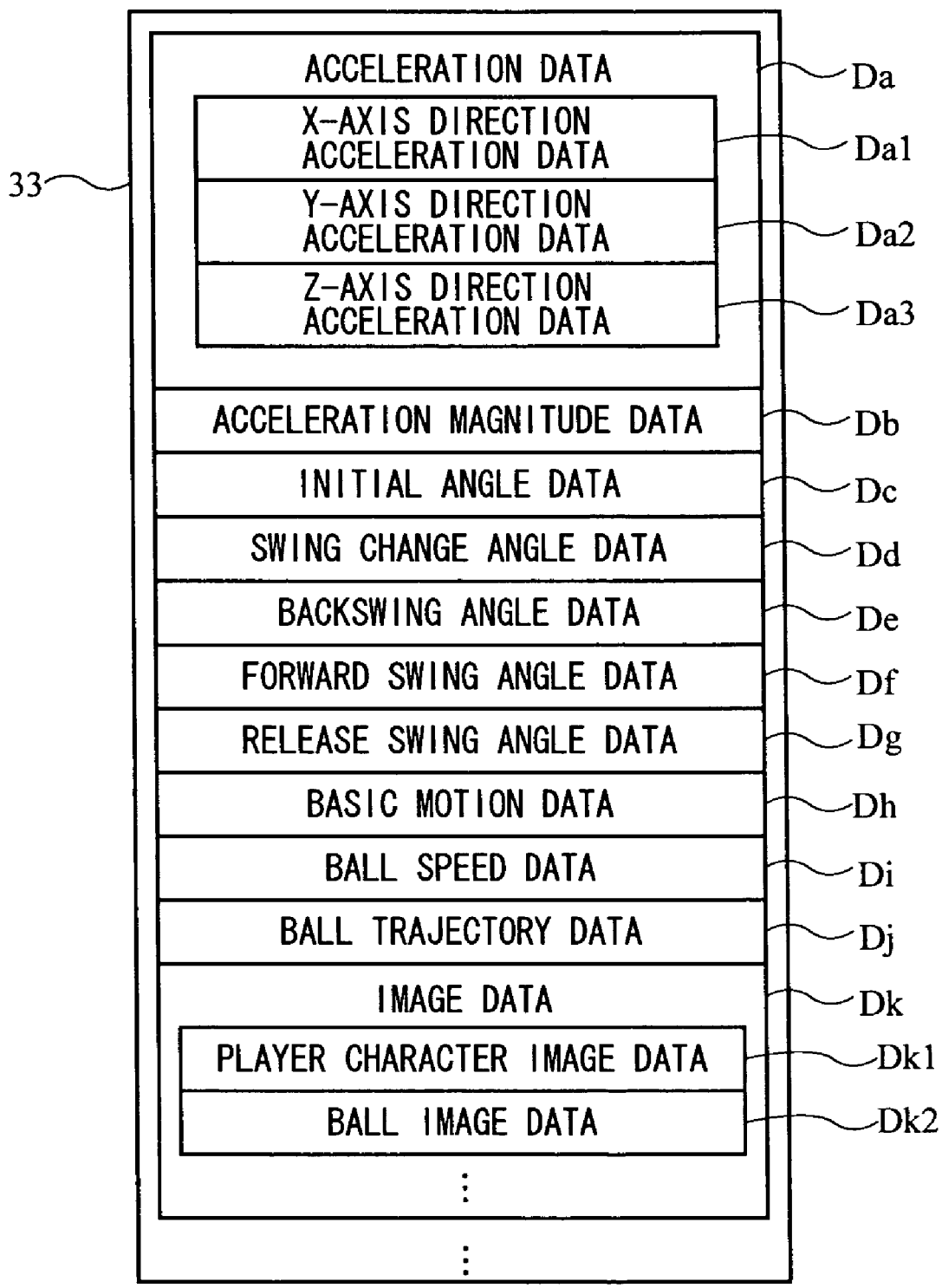
FIG. 9 is a diagram illustrating main data which is stored in a main memory 33 of the game apparatus main body 5 of FIG. 5.

As illustrated in FIG. 9, the main memory 33 stores acceleration data Da, acceleration magnitude data Db, initial angle data Dc, swing change angle data Dd, backswing angle data De, forward swing angle data Df, release swing angle data Dg, basic motion data Dh, ball speed data Di, ball trajectory data Dj, image data Dk, and the like. Note that, in addition to the data included in the information of FIG. 9, the main memory 33 stores data required for a game process, such as data about a player character PC, other objects, and the like appearing in a game (position data, etc.), data about a virtual game space (data about background, a lane, etc.), and the like.

The acceleration data Da is acceleration data which is included in a series of pieces of operational information transmitted as transmission data from the controller 7. The acceleration data Da includes X-axis direction acceleration data Da1, Y-axis direction acceleration data Da2, and Z-axis direction acceleration data Da3 which are detected by the acceleration sensor 701 with respect to three axial components (X, Y, and Z axes), respectively. Note that the communication unit 6 included in the game apparatus main body 5 receives acceleration data included in operational information transmitted from the controller 7 in predetermined cycles (e.g., every 5 ms), which is in turn stored into a buffer (not shown) included in the communication unit 6. Thereafter, the acceleration data is read every a frame which is a game process interval so that the acceleration data Da in the main memory 33 is updated. In this example, the acceleration data Da is stored after a predetermined number of previous frames of acceleration data transmitted from the controller 7 are updated as appropriate. The acceleration magnitude data Db is data which indicates the magnitude a of an acceleration of the controller 7, and is calculated using the X-axis direction acceleration data Da1, the Y-axis direction acceleration data Da2, and the Z-axis direction acceleration data Da3.

The initial angle data Dc is data which indicates an initial state before the player character PC performs backswing, which is represented by, for example, an initial swing angle $\Theta$st of a swing angle of the player character PC. The swing angle $\Theta$ is defined as, for example, an angle of an arm swung by the player character PC with respect to a reference direction. The swing change angle data Dd is data which indicates a change angle $\theta$ by which the swing angle $\Theta$ is changed when the player character PC performs backswing or forward swing. The backswing angle data De is data which indicates a swing angle $\Theta$back when the player character PC performs backswing. The forward swing angle data Df is data which indicates a swing angle $\Theta$for when the player character PC performs forward swing. The release swing angle data Dg is data which indicates a swing angle $\Theta$throw when the player character PC releases a ball.

The basic motion data Dh is data which is a basis for a motion of the player character PC throwing a ball. For example, the basic motion data Dh is data for displaying a series of throwing motions of the player character PC (address→backswing→forward swing→ball release→finish) on the monitor 2, and a speed of the motion is controlled based on the swing angle. The ball speed data Di is data which indicates a speed of a ball B which moves on a lane after the player character PC releases the ball. The ball trajectory data Dj is data which indicates a trajectory of the ball B moving on the lane after the player character PC releases the ball.

The image data Dk is data which includes player character image data Dk1, ball image data Dk2, and the like, and is used to arrange the player character PC and the ball B in the virtual game space to generate a game image.

Figure 10:
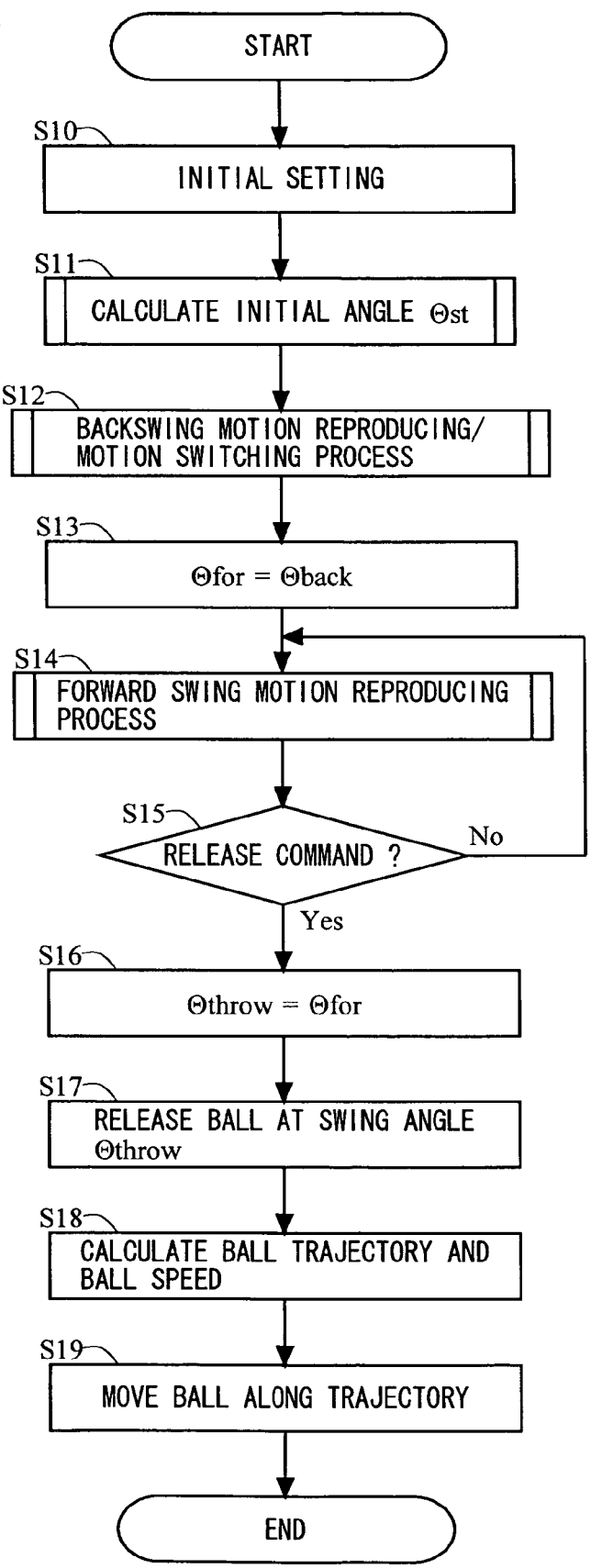
FIG. 10 is a flowchart of a game process performed in the game apparatus main body 5 of FIG. 1.
Figure 11:
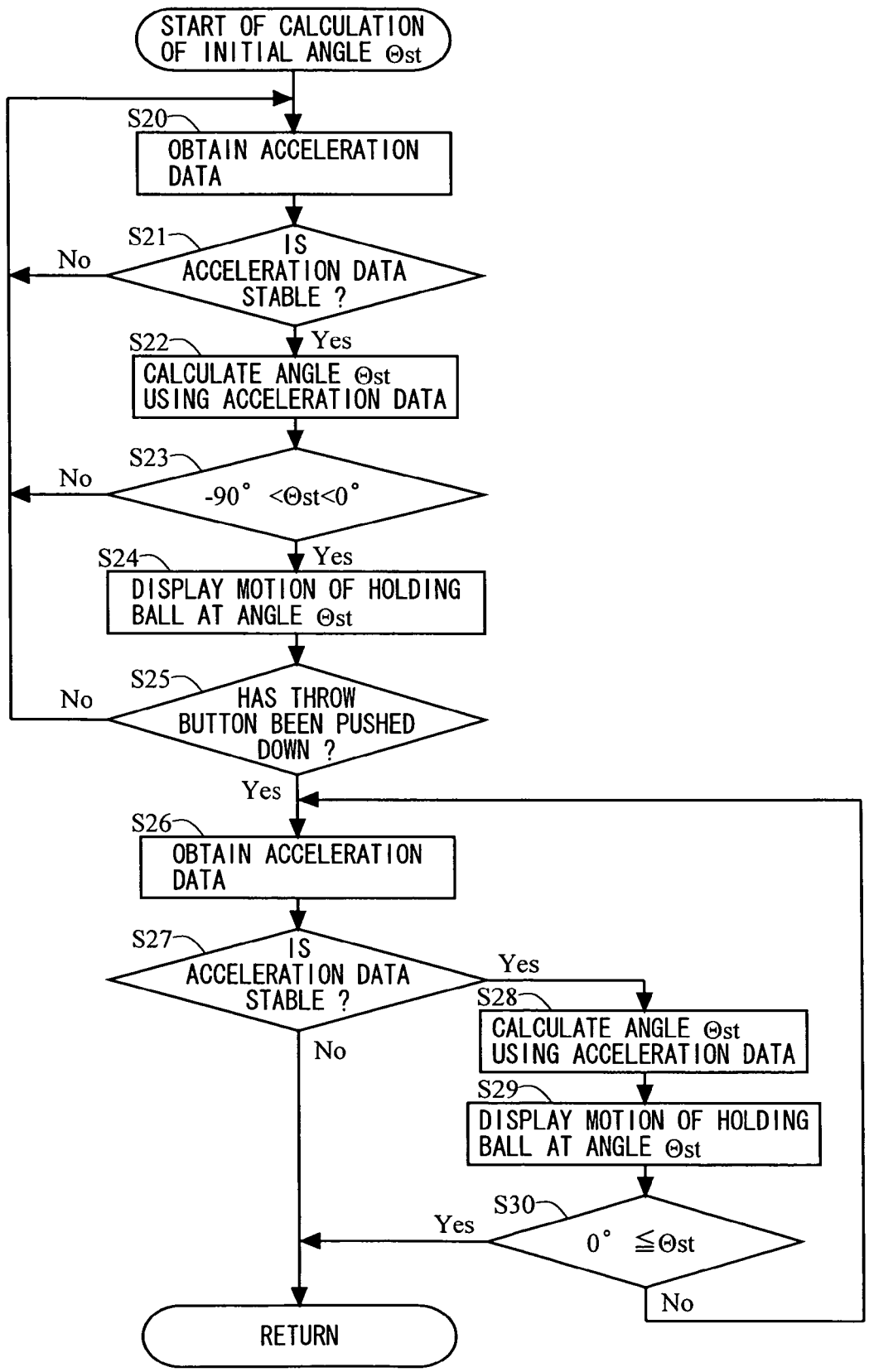
FIG. 11 is a subroutine indicating a detailed process of calculating an initial angle Θst in step 11 of FIG. 10.
Figure 12:
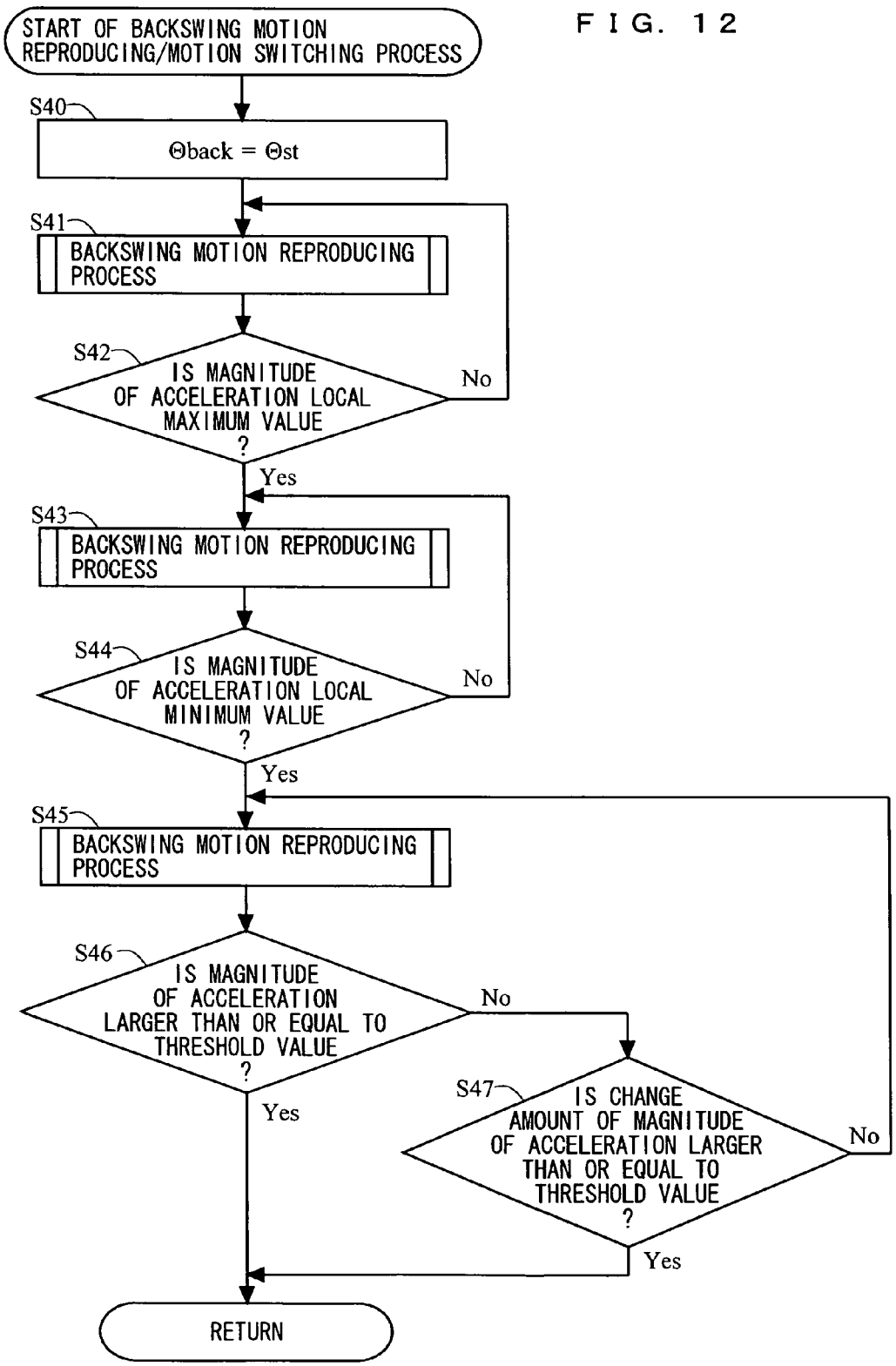
FIG. 12 is a subroutine indicating a detailed backswing motion reproducing/motion switching process in step 12 of FIG. 10.
Figure 13:
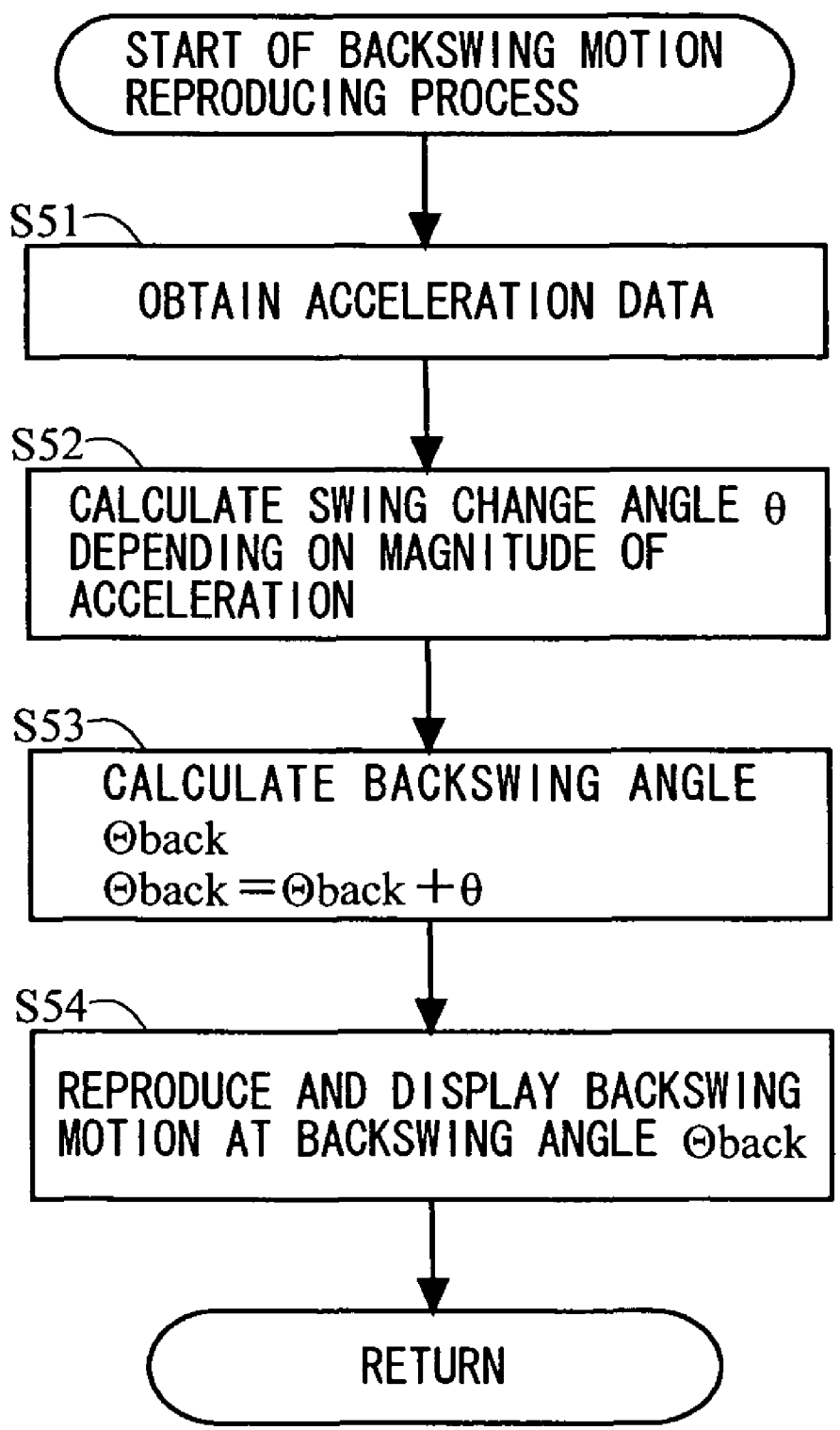
FIG. 13 is a subroutine indicating a detailed backswing motion reproducing process in steps 41, 43 and 45 of FIG. 12.
Figure 14:
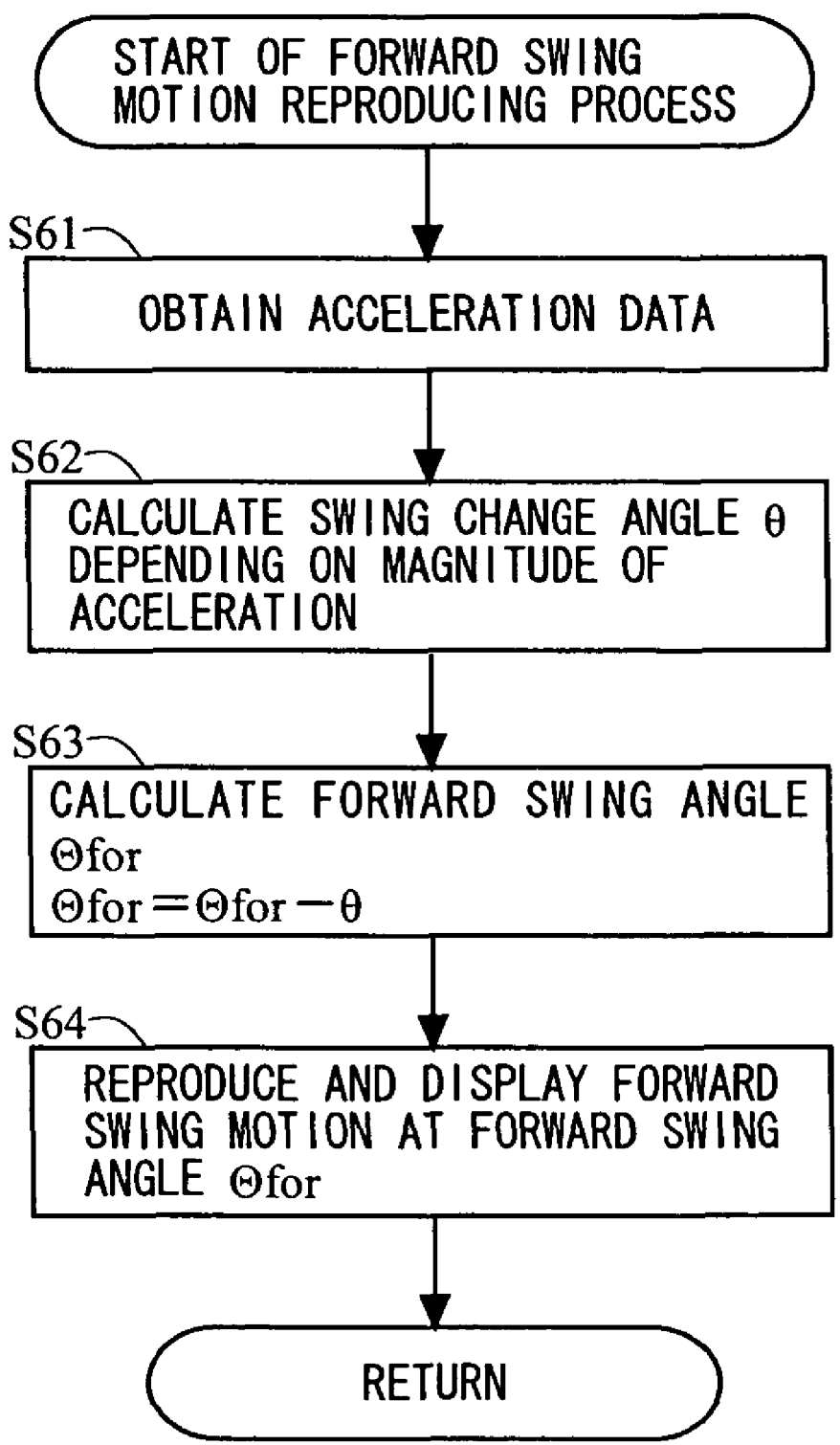
FIG. 14 is a subroutine indicating a detailed forward swing motion reproducing process in step 14 of FIG. 10.
Figure 15:
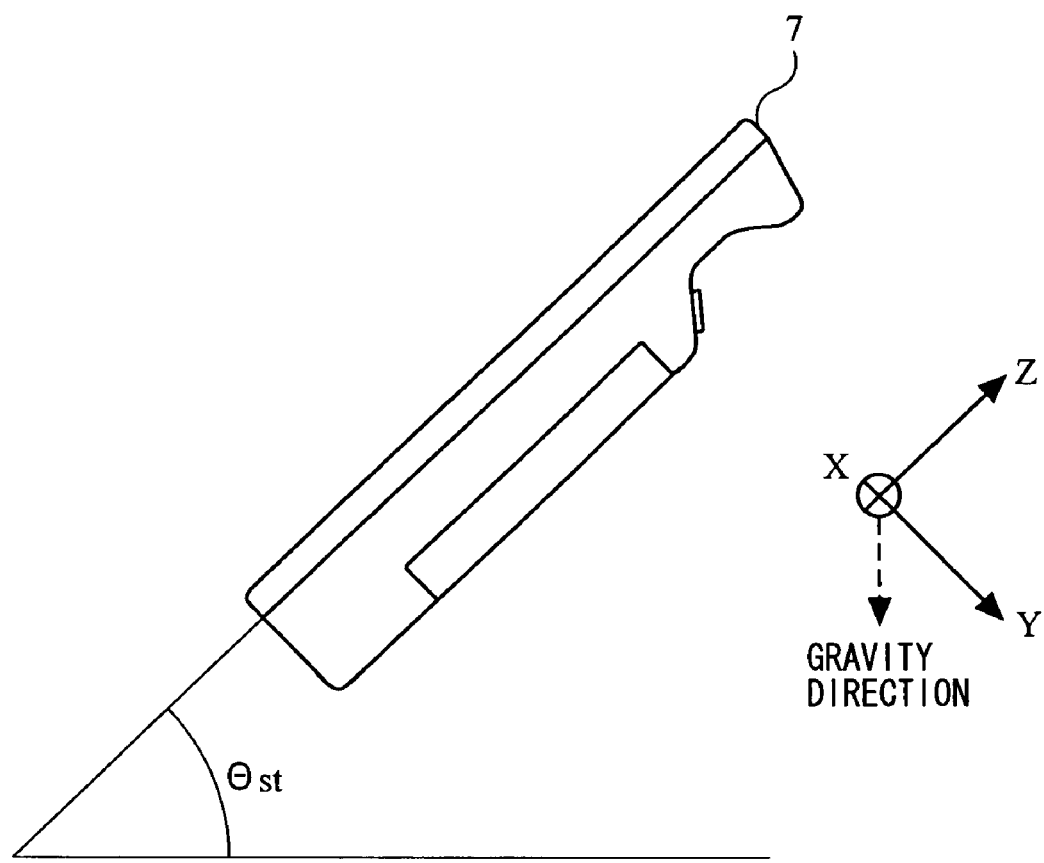
FIG. 15 is a diagram illustrating an exemplary state of the controller 7 of FIG. 3 which is statically tilted.
Figure 16:
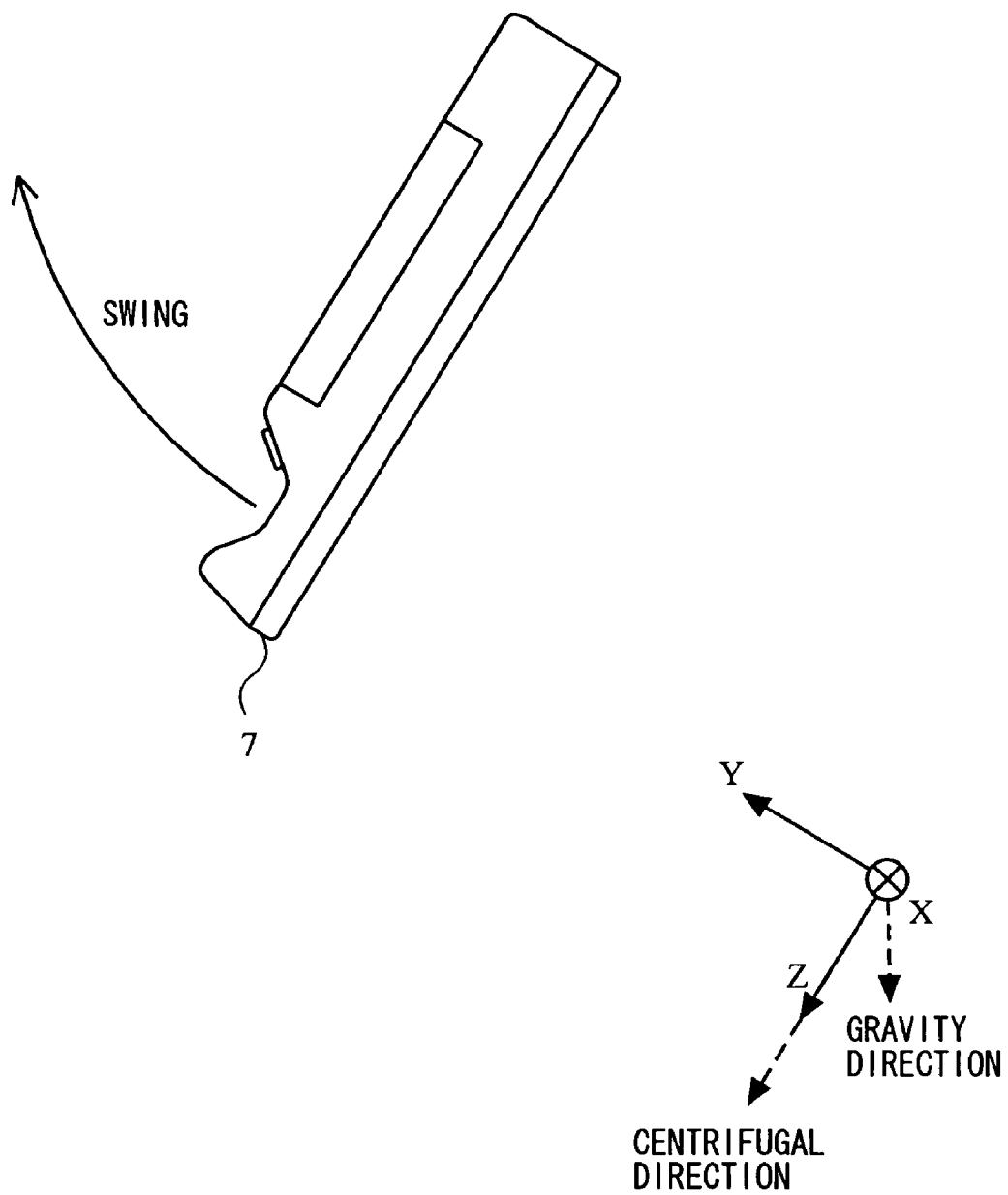
FIG. 16 is a diagram illustrating an exemplary state of the controller 7 of FIG. 3 which is being swung.
Figure 17:
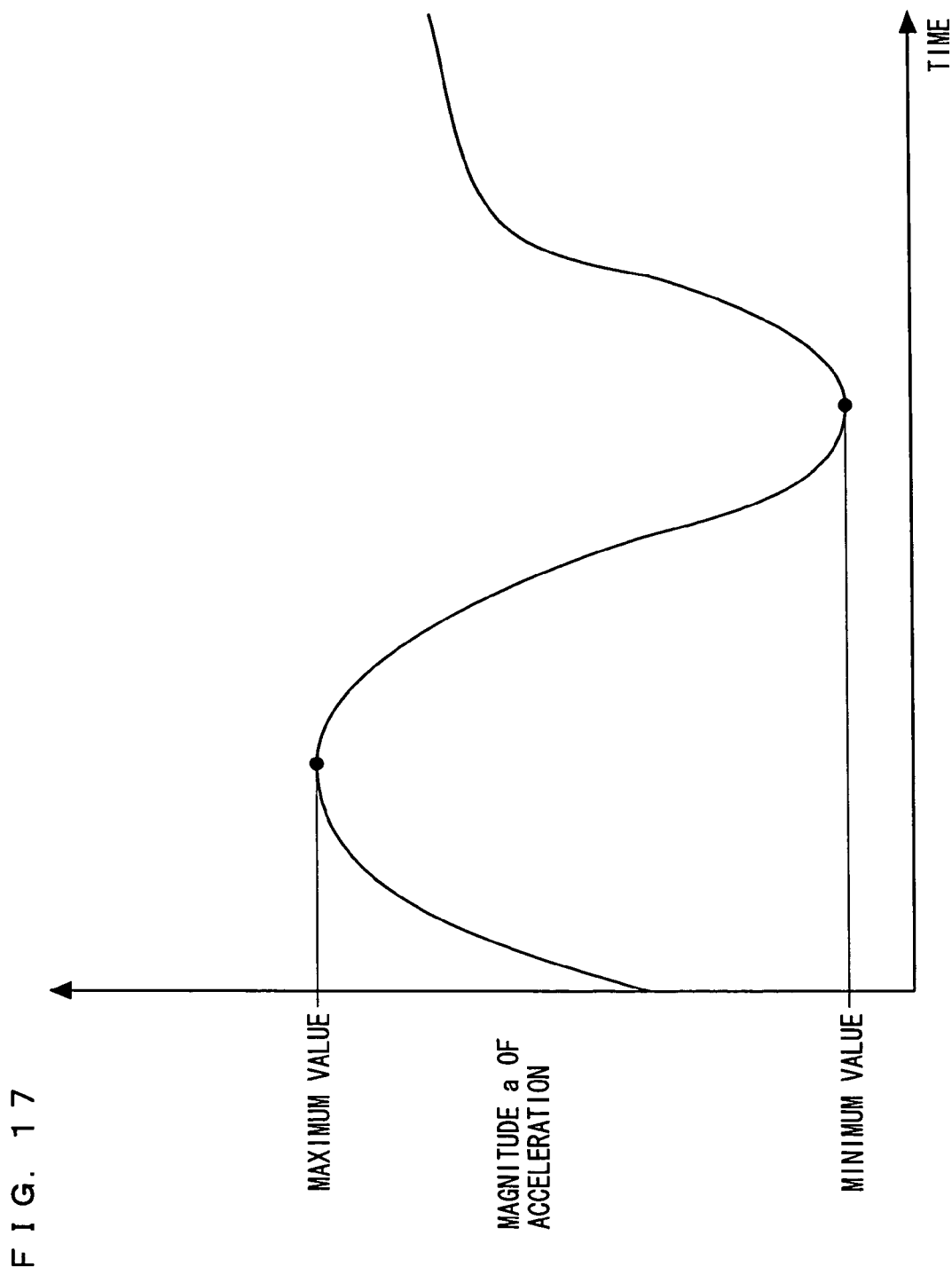
FIG. 17 is a diagram illustrating an exemplary change in acceleration of the controller 7 of FIG. 3 when the controller 7 is swung.
Figure 20:
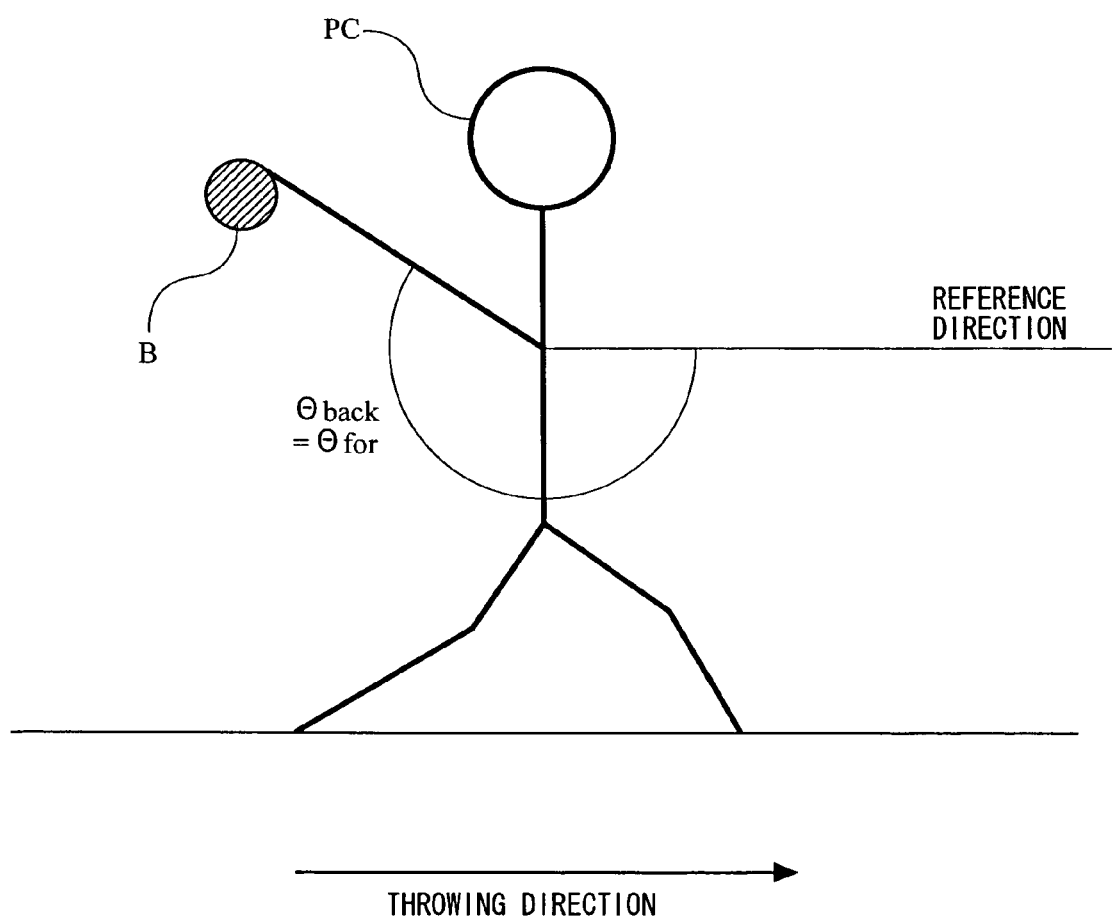
FIG. 20 is a diagram illustrating an exemplary motion of the player character PC switching from backswing to forward swing at a swing angle Θback (Θfor)
Figure 21:
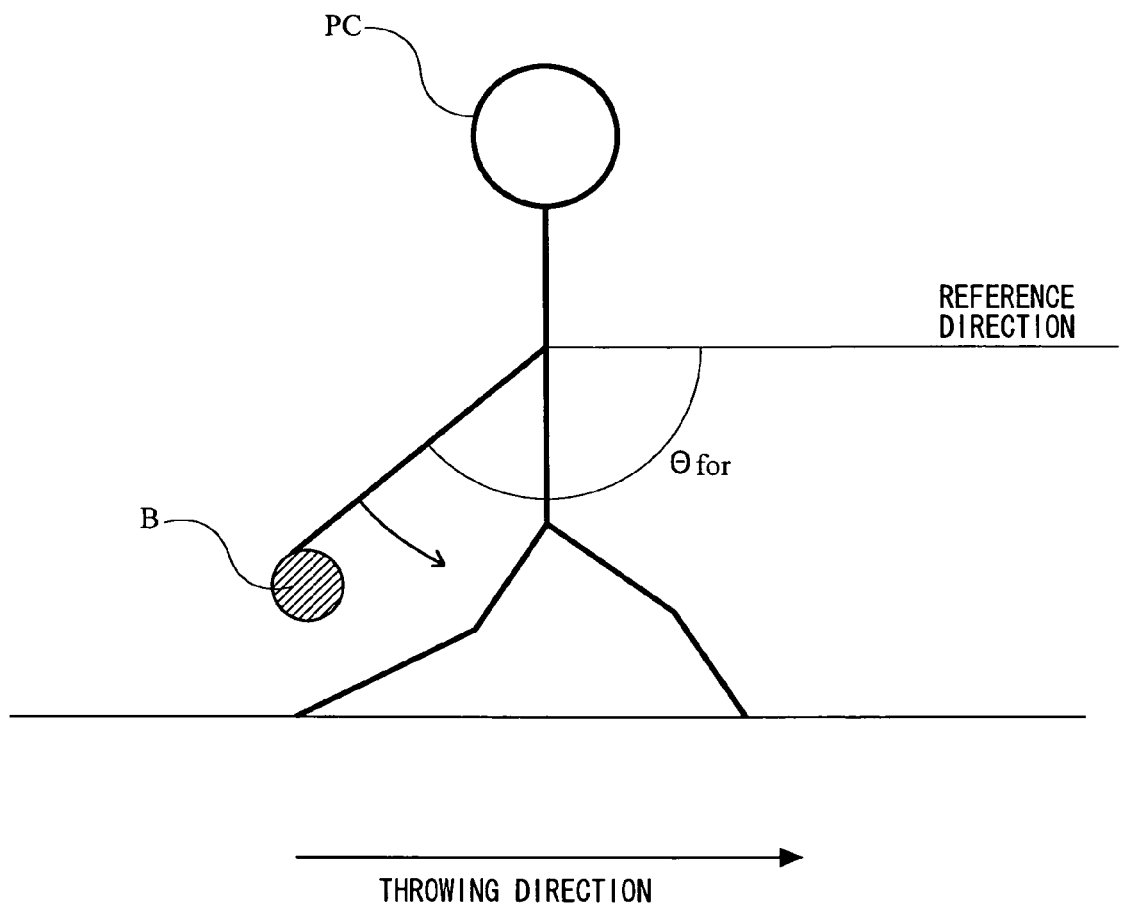
FIG. 21 is a diagram illustrating an exemplary motion of the player character PC performing forward swing at a swing angle Θfor.

Next, a game process performed in the game apparatus main body 5 will be described in detail with reference to FIGS. 10 to 22. Note that FIG. 10 is a flowchart of the game process performed in the game apparatus main body 5. FIG. 11 is a subroutine indicating a detailed process of calculating the initial angle Θst in step 11 of FIG. 10. FIG. 12 is a subroutine indicating a detailed backswing motion reproducing/motion switching process in step 12 of FIG. 10. FIG. 13 is a subroutine indicating a detailed backswing motion reproducing process in steps 41, 43 and 45 of FIG. 12. FIG. 14 is a subroutine indicating a detailed forward swing motion reproducing process in step 14 of FIG. 10. FIG. 15 is a diagram illustrating an exemplary state of the controller 7 which is statically tilted. FIG. 16 is a diagram illustrating an exemplary state of the controller 7 which is being swung. FIG. 17 is a diagram illustrating an exemplary change in acceleration of the controller 7 when the controller 7 is swung. FIG. 18 is a diagram illustrating an exemplary initial state of the player character PC holding the ball B at a swing angle Θst before backswing. FIG. 19 is a diagram illustrating an exemplary motion of the player character PC performing backswing at a swing angle Θback. FIG. 20 is a diagram illustrating an exemplary motion of the player character PC switching from backswing to forward swing at a swing angle Θback (Θfor). FIG. 21 is a diagram illustrating an exemplary motion of the player character PC performing forward swing at a swing angle Θfor. FIG. 22 is a diagram illustrating an exemplary motion of the player character PC releasing the ball B at a swing angle Θthrow. Note that, regarding the flowcharts of FIGS. 10 to 14, game processes for motions of the player character PC which are expressed, depending on swinging of the controller 7 by a player, will be described, and other game processes which are not directly related to the present invention will not be described in detail. In FIGS. 10 to 14, each "step" of the CPU 30 is abbreviated "S".

When the game apparatus main body 5 is powered ON, the CPU 30 of the game apparatus main body 5 executes a boot program stored in a boot ROM (not shown), thereby initializing each unit, such as the main memory 33 and the like. Thereafter, a game program stored in the optical disc 4 is read into the main memory 33, and execution of the game program is started by the CPU 30. The flowcharts of FIGS. 10 to 14 indicate a game process after completion of the above-described process.

In FIG. 10, the CPU 30 initializes the game process (step 10), and causes the process to go to the next step. For example, the CPU 30 sets a lane on which a game is performed, and initializes each piece of data stored in the main memory 33.

Next, the CPU 30 calculates an initial angle Θst (step 11), and causes the process to go to the next step. Hereinafter, the process of calculating the initial angle Θst in step 11 will be described with reference to FIG. 11.

In FIG. 11, the CPU 30 obtains acceleration data included in operational information received from the controller 7 (step 20), and causes the process to go to the next step. Thereafter, the CPU 30 stores the obtained acceleration data as the acceleration data Da into the main memory 33. Here, the acceleration data obtained in step 20 includes X, Y, and Z-axis direction acceleration data which are detected by the acceleration sensor 701 with respect to three axial components (X, Y, and Z axes), respectively. Here, the communication section 75 transmits operational information to the game apparatus main body 5 in predetermined cycles (e.g., every 5 ms), and at least acceleration data is stored into a buffer (not shown) included in the communication unit 6. Thereafter, the CPU 30 obtains the acceleration data stored in the buffer every one frame which is a game process unit, and stores the acceleration data into the main memory 33. Note that, as described above, a predetermined number of previous frames of acceleration data transmitted from the controller 7 are updated as appropriate before being stored into the main memory 33.

Next, the CPU 30 waits until the acceleration data obtained in step 20 becomes stable (step 21). For example, when a change width between an acceleration indicated by the acceleration data obtained in step 20 and an acceleration indicated by acceleration data obtained in the immediately previous frame is within a predetermined range, the CPU 30 determines that the acceleration data is stable. Alternatively, when a change width between each of accelerations indicated by acceleration data obtained in several previous frames including the acceleration indicated by the acceleration data obtained in step 20 is within a predetermined range, the CPU 30 determines that the acceleration data is stable. Thereafter, when the acceleration data obtained in step 20 becomes stable (Yes in step 21), the CPU 30 causes the process to go to the next step 22. On the other hand, when the acceleration data obtained in step 20 is not stable (No in step 21), the CPU 30 repeats step 20.

In step 22, the CPU 30 calculates an initial angle Θst using the latest acceleration data obtained in step 20. Thereafter, the CPU 30 stores the calculated initial angle Θst into the initial angle data Dc, and causes the process to go to the next step.

Here, a relationship between a tilt and the initial angle Θst of the controller 7 will be described with reference to FIG. 15. For example, as illustrated in FIG. 15, when the controller 7 is held stationary while the upper surface thereof being tilted by an angle Θst from a horizontal direction so that the front surface thereof faces upward, the acceleration sensor 701 of the controller 7 detects a static gravitational acceleration occurring in a direction between the positive Y-axis direction and the negative Z-axis direction. Thereafter, the CPU 30 calculates the angle Θst by which the controller 7 is tilted with respect to the horizontal direction in a real space, depending on an output of the acceleration sensor 701 which detects the gravitational acceleration. More specifically, for example, assuming that the horizontal direction is defined as 0° which is a reference, and an angle measured downward from the reference, i.e., in a clockwise direction in FIG. 15, has a positive value, the CPU 30 calculates the initial angle Θst by:

$$\Theta st = \arctan(Za/Ya)$$

where Ya represents a Y-axis direction acceleration indicated by the latest Y-axis direction acceleration data Da2, and Za represents a Z-axis direction acceleration indicated by the latest Z-axis direction acceleration data Da3. Note that, as can be clearly seen from FIG. 15, when the upper surface of the controller 7 is tilted by the angle Θst from the horizontal direction so that the front surface of the controller 7 faces upward, the direction of gravity occurring in the controller 7 is located between the positive Y-axis direction and the negative Z-axis direction, so that the angle Θst indicates a negative value. In other words, when the upper surface of the controller 7 is tilted by 0° to +90° with respect to a horizontal direction ahead of the chest of the player as a reference (0°) so that the front surface of the controller 7 faces upward, the initial angle Θst varies within the range of −90°<Θst<0°.

Referring back to FIG. 11, the CPU 30 determines whether or not the initial angle Θst calculated in step 22 is within the range of −90°<Θst<0° (step 23). Thereafter, when the initial angle Θst is within the range of −90<Θst<0°, the CPU 30 causes the process to go to the next step 24. On the other hand, when the initial angle Θst is not within the range of −90°<Θst<0° (i.e., it is not the case that the controller 7 is held stationary by the player while the controller 7 faces upward ahead of the player), the CPU 30 returns to step 20 and repeats the process of step 20.

In step 24, the CPU 30 references the initial angle Θst stored in the initial angle data Dc, displays on the monitor 2 a motion of the player character PC holding a ball at a swing angle which is the initial angle Θst, and causes the process to go to the next step. Hereinafter, the motion of the player character PC holding the ball at the swing angle which is the initial angle Θst will be described with reference to FIG. 18.

In FIG. 18, assuming that a horizontal direction (throwing direction) ahead of the player character PC is a reference direction, an angle from the reference direction of an arm of the player character PC swinging up the ball B and holding the ball B in a stationary manner is the initial angle Θst. In other words, the player character PC swings up the ball B by the swing angle Θst from the reference direction and holds the ball B in a stationary manner (initial state) before performing backswing. Note that the sign (the positive sign or the negative sign) of the swing angle Θst is changed at the reference direction as a boundary. In this example, a swing angle in a direction in which the player character PC performs backswing downward from the reference direction is assumed to be a positive angle Θ, and a swing angle in a direction in which the player character PC swings the ball B upward from the reference direction is assumed to be a negative angle Θ. Here, as described above, the initial angle Θst is within the range of −90°<Θst<0° (i.e., a negative angle), and the player character PC swings the arm by the angle Θst upward ahead of the chest and holds the ball B in a stationary manner.

Also, as described above with reference to FIG. 15, when the player holds the controller 7 in a stationary manner while the upper surface of the controller 7 is tilted by the angle Θst from the horizontal direction so that the front surface of the controller 7 faces upward, the initial angle Θst is calculated. Therefore, the swing angle Θ in the initial state before the player character PC performs swing varies depending on an attitude (acceleration data value) of the controller 7 held by the player. Specifically, by setting the angle at which the upper surface of the controller 7 is tilted to be the initial angle Θst, the player character PC swings up the arm ahead of the chest and holds the ball B in a stationary manner at the same angle as the upper-surface angle of the controller 7 tilted by the player. Thereby, the player can be given a sensation as if the player itself held the ball B.

The CPU 30 displays on the monitor 2 a motion of holding the ball B at the initial angle ηst as a swing angle using basic motion data of the player character PC stored in the basic motion data Dh. For example, the CPU 30 designates an address state (i.e., before backswing) using the basic motion data, and designates a swing angle Θ of the player character PC, so that the motion of the player character PC holding the ball B in a stationary manner at the initial angle Θst as a swing angle is displayed.

Note that, in the above description, the player character PC swings up the arm ahead of the chest by the same angle as an angle by which the upper surface of the controller 7 is tilted, and holds the ball B in a stationary manner, thereby making it possible to obtain an effect that the attitude of the player (the attitude of the controller 7) matches the attitude of the player character PC. However, when such an effect is not expected, the angle by which the upper surface of the controller 7 is tilted does not have to be equal to the swing angle. If the swing angle at which the player character PC holds the ball B is designed to change in accordance with an operation of changing the attitude of the controller 7, the above-described two angles may be different from each other.

Referring back to FIG. 11, the CPU 30 obtains key data included in operational information received from the controller 7, and determines whether or not the player has pushed down a throw button of the controller 7 (step 25). For example, the operation button 72i is set to be the throw button, and the CPU 30 obtains key data indicating an operation state of the operation button 72i, and determines whether or not the operation button 72i has been pushed down. Thereafter, when the throw button has been pushed down, the CPU 30 causes the process to go to the next step 26. On the other hand, when the throw button has not been pushed down, the CPU 30 returns to step 20 and repeats the process of step 20.

In step 26, the CPU 30 obtains acceleration data included in operational information received from the controller 7, stores the obtained acceleration data as new acceleration data Da into the main memory 33, and causes the process to go to the next step. Note that the process of step 26 is similar to that of step 20 and will not be described in detail.

Next, the CPU 30 determines whether or not the acceleration data obtained in step 26 has become stable (step 27). Note that the determination method of step 27 is similar to that of step 21 and will not be described in detail. Thereafter, when the acceleration data continues to be stable, the CPU 30 causes the process to go to the next step 28. On the other hand, when the acceleration data is unstable, the CPU 30 ends the process of the subroutine.

In step 28, the CPU 30 calculates an initial angle Θst using the latest acceleration data obtained in step 26. Thereafter, the CPU 30 updates the initial angle data Dc with the calculated initial angle Θst. Next, the CPU 30 references the initial angle Θst stored in the initial angle data Dc, displays on the monitor 2 a motion of the player character PC holding the ball B at the initial angle Θst as a swing angle (step 29), and causes the process to go to the next step. Note that the processes of steps 28 and 29 are similar to the processes of steps 22 and 24, respectively, and will not be described in detail.

Next, the CPU 30 determines whether or not the initial angle Θst calculated in step 28 is within the range of 0°≦Θst (step 30). Thereafter, when the initial angle Θst is within the range of Θst<0°, the CPU 30 returns to step 26 and repeats the process of step 26. On the other hand, when the initial angle Θst is within the range of 0°≦Θst (i.e., the player tilts the controller 7 so that the controller faces downward ahead of the chest while the acceleration data is kept stable), the CPU 30 ends the process of the subroutine. Although the condition for the angle Θst in step 30 is assumed to be 0°≦Θst in this example, it may be determined whether or not the angle Θst is larger than or equal to a predetermined threshold value instead of 0°, as required.

Note that, after the end of the subroutine, the CPU 30 goes to a backswing motion reproducing process described below. Here, the subroutine is ended when it is determined in step 27 that the acceleration data is unstable or when it is determined in step 30 that the initial angle Θst is within the range of 0°≦Θst. In the former, the acceleration data once becomes stable, so that the initial angle Θst is set and the player character PC holds the ball 3 at the initial angle Θst, and thereafter, the throw button is pushed down, and the controller 7 is swung and moved. In this case, it is detected that the player holds the ball in a stationary manner and then starts backswing. In the latter, the acceleration data once becomes stable, so that the initial angle Θst is set and the player character PC holds the ball 3 at the initial angle Θst, and thereafter, the throw button is pushed down, and the controller 7 is gently tilted downward.

Referring back to FIG. 10, after the calculation of the initial angle Θst, the CPU 30 performs a backswing motion reproducing process/motion switching process (step 12), and causes the process to go to the next step. Hereinafter, the backswing motion reproducing process/motion switching process performed in step 12 will be described with reference to FIG. 12.

In FIG. 12, the CPU 30 sets the currently set initial angle Θst to be a swing angle Θback for backswing, and stores the swing angle Θback into the backswing angle data De (step 40). In other words, the initial angle Θst which is finally set in step 11 is an initial value of the swing angle Θback for backswing. Next, the CPU 30 performs a backswing motion reproducing process (step 41), and causes the process to go to the next step. Hereinafter, the backswing motion reproducing process will be described with reference to FIG. 13.

In FIG. 13, the CPU 30 obtains acceleration data included from operational information received from the controller 7, and stores the obtained acceleration data as new acceleration data Da into the main memory 33 (step 51), and causes the process to go to the next step. Note that the process of step 51 is similar to the process of step 20 and will not be described in detail.

Next, the CPU 30 calculates a swing change angle θ, depending on the magnitude of an acceleration indicated by the acceleration data obtained in step 51 (step 52), and causes the process to go to the next step. For example, the CPU 30 calculates the magnitude a of the acceleration indicated by the acceleration data by:

$$a=\sqrt{Xa^2+Ya^2+Za^2} \quad (1)$$

where Xa represents an X-axis direction acceleration indicated by the latest X-axis direction acceleration data Da1, Ya represents a Y-axis direction acceleration indicated by the latest Y-axis direction acceleration data Da2, and Za represents a Z-axis direction acceleration indicated by the latest Z-axis direction acceleration data Da3. Thereafter, the CPU 30 stores the magnitude a of the acceleration into the acceleration magnitude data Db. Thereafter, the CPU 30 calculates a swing change angle θ by:

$$\theta=k(a-Ga) \quad (2)$$

where Ga represents a constant indicating the magnitude of a gravitational acceleration acting on the controller 7 (e.g., 1), and k represents a coefficient for converting the magnitude of an acceleration into a change angle. Thereafter, the CPU 30 stores the swing change angle θ into the swing change angle data Dd. Note that the coefficient k is preferably set so that a change in angle of the controller 7 which is swung by the player and the swing change angle θ are equal to each other. For example, by analyzing a relationship between the magnitude a of an acceleration and the change in angle of the controller 7 which is swung by the player, a coefficient k can be set which causes the change in angle of the controller 7 which is swung by the player and the swing change angle θ to be equal to each other. Thereby, as can be clearly seen from a description below, since the change in angle of the controller 7 which is swung by the player and the swing angle of the player character PC are equal to each other, a motion of the player swinging the controller 7 can be realistically simulated by a swing motion of the player character PC.

As illustrated in FIG. 16, when the player swings and moves the controller 7, the acceleration sensor 701 of the controller 7 detects a centrifugal force or an acceleration in a swinging direction or an anti-swinging direction that are caused by the swing motion, in addition to the above-described static gravitational acceleration. Here, if a centrifugal force component or an acceleration component in a swinging direction or an anti-swinging direction can be extracted based on an output of the acceleration sensor 701, a movement speed of the controller 7 can be analyzed when the centrifugal force or the acceleration acts on the controller 7. Here, in general, regarding forces acting on the controller 7, the centrifugal force or the gravitational acceleration practically has a larger influence than that of the acceleration in the swinging direction or the anti-swinging direction. Therefore, in this example, the magnitude of the gravitational acceleration is subtracted from the magnitude of the acceleration indicated by the output of the acceleration sensor 701, and the result is regarded as the magnitude of the centrifugal force component, and the magnitude of the centrifugal force component is converted into the swing change angle θ.

Referring back to FIG. 13, the CPU 30 calculates a backswing angle Θback using the swing change angle θ calculated in step 52 (step 53), and causes the process to go to the next step. For example, the CPU 30 references the backswing angle Θback stored in the backswing angle data De to calculate Θback+θ as a new backswing angle Θback. Thereafter, the CPU 30 updates the backswing angle data De with the new backswing angle Θback.

Next, the CPU 30 references the backswing angle Θback stored in the backswing angle data De, displays on the monitor 2 a motion of the player character PC performing backswing at the backswing angle Θback as a swing angle (step 54), and ends the process of the subroutine. For example, the CPU 30 designates a backswing state using the basic motion data stored in the basic motion data Dh, and designates a swing angle Θ of the player character PC, so that a backswing motion is displayed, where the backswing angle Θback is used as a swing angle. Hereinafter, the motion of the player character PC performing backswing using the backswing angle Θback as a swing angle will be described with reference to FIG. 19.

In FIG. 19, assuming that a horizontal direction ahead of the player character PC is a reference direction, an angle from the reference direction of an arm of the player character PC swinging the ball B backward is the backswing angle Θback. In other words, the player character PC has a motion of swinging the ball B backward by the backswing angle Θback from the reference direction. Note that the sign (the positive sign or the negative sign) of the backswing angle Θback is also changed at the reference direction as a boundary, as is similar to the initial angle Θst. In this example, a swing angle in a direction in which the player character PC performs backswing downward from the reference direction is assumed to be a positive angle Θ, and a swing angle in a direction in which the player character PC swings the ball B upward from the reference direction is assumed to be a negative angle Θ. Here, as described above, since the initial angle Θst may be a negative angle, the backswing angle Θback may be set to be a negative angle during an initial period of backswing, and backswing may be started from a position of the ball B which has been swung up above the reference direction.

The backswing angle Θback is a value to which the swing change angle θ is added by the process of step 53, and is increased every time the process is repeated. The swing change angle θ is an angle which is calculated, depending on the magnitude of an acceleration detected by the acceleration sensor 701 of the controller 7, and an angle which is calculated, depending on a centrifugal force caused by the player swinging the controller 7. More specifically, the larger the centrifugal force occurring in the controller 7, the larger the calculated swing change angle θ, and as a result, the larger the change angle of the backswing angle Θback. In other words, the player character PC performs backswing, depending on the motion of the player swinging the controller 7. The swing speed of backswing performed by the player character PC changes in real time, depending on the magnitude of an acceleration which is detected by the acceleration sensor 701, depending on swinging performed by the player. Therefore, by swinging and moving the controller 7, the player can be given a sensation as if the player itself swung the ball B backward.

Referring back to FIG. 12, after the backswing motion reproducing process in step 41, the CPU 30 determines whether or not the magnitude a of an acceleration indicates a local maximum value (step 42). For example, the CPU 30 determines whether or not the magnitude a of the acceleration indicates a local maximum value, using a history of acceleration data detected by the acceleration sensor 701 or a history of the magnitude a of the acceleration. Note that the determination of a local maximum value may be performed using an existing well-known determination method. Thereafter, when the magnitude a of the acceleration indicates a local maximum value, the CPU 30 causes the process to go to the next step 43. On the other hand, when the magnitude a of the acceleration has not yet indicated a local maximum value, the CPU 30 returns to step 41 and repeats the process of step 41. Hereinafter, a change in magnitude of an acceleration occurring in the controller 7 will be described with reference to FIG. 17.

In FIG. 17, a motion of a player holding the controller 7 with one hand and swinging the controller 7 as if the player threw a bowling ball can be divided into a stance before throwing→pushing a throw button→backswing→forward swing→releasing the throw button→releasing the ball→follow-through. During the start of backswing, the player holds the controller 7 in substantially a stationary manner. Therefore, by the player performing backswing, a centrifugal force acting on the controller 7 gradually increases. Therefore, after the start of backswing, the magnitude a of the acceleration calculated in step 52 also gradually increases. Thereafter, when the centrifugal force acting on the controller 7 due to the player's backswing reaches a local maximum value, the magnitude a of the acceleration also reaches a local maximum value. Thereafter, for example, upon or before the player switches from backswing to forward swing, the centrifugal force acting on the controller 7 becomes 0, so that the magnitude a of the acceleration reaches a local minimum value. Thus, by detecting the successive changes (a local maximum value and then a local minimum value) in the magnitude a of the acceleration, it can be determined that the player has changed a motion from backswing to forward swing.

In step 43, the CPU 30 performs a backswing motion reproducing process. Note that the backswing motion reproducing process performed in step 43 is similar to that in step 41 and will not be described in detail. Next, the CPU 30 determines whether or not the magnitude a of the acceleration indicates a local minimum value (step 44). For example, the CPU 30 determines whether or not the magnitude a of the acceleration indicates a local minimum value, using the history of acceleration data detected by the acceleration sensor 701 or the history of the magnitude a of the acceleration. Note that the determination of a local minimum value may also be performed using an existing well-known determination method. Thereafter, when the magnitude a of the acceleration indicates a local minimum value, the CPU 30 causes the process to go to the next step 45. On the other hand, when the magnitude a of the acceleration has not yet indicated a local minimum value, the CPU 30 returns to step 43 and repeats the process of step 43.

In step 45, the CPU 30 performs a backswing motion reproducing process. Note that the backswing motion reproducing process performed in step 45 is similar to that in step 41 and will not be described in detail. Next, the CPU 30 determines whether or not the magnitude a of the acceleration indicates a value which is larger than or equal to a predetermined threshold value (step 46). For example, the CPU 30 determines whether or not a value obtained by subtracting an amount corresponding to the gravitational acceleration (e.g., 1) from the magnitude a of the acceleration is larger than or equal to a threshold value. Thereafter, when the magnitude a of the acceleration indicates a value less than the threshold value, the CPU 30 causes the process to go to the next step 47. On the other hand, when the magnitude a of the acceleration indicates a value larger than or equal to the threshold value, the CPU 30 ends the process of the subroutine.

In step 47, the CPU 30 determines whether or not the amount of a change in the magnitude a of the acceleration indicates a value which is larger than or equal to a predetermined threshold value. Thereafter, when the amount of a change in the magnitude a of the acceleration indicates a value which is less than the predetermined threshold value, the CPU 30 returns to step 45 and repeats the process of step 45. On the other hand, when the amount of a change in the magnitude a of the acceleration indicates a value which is larger than or equal to the predetermined threshold value, the CPU 30 ends the process of the subroutine.

As can be clearly seen from the processes of steps 40 to 47, the CPU 30 determines that the player has changed a motion from backswing to forward swing, by detecting a local maximum value and a local minimum value of the magnitude a of the acceleration occurring in the controller 7. Thereafter, when the magnitude a of the acceleration occurring in the controller 7 indicates a magnitude which is larger than or equal to a threshold value, or when the amount of a change in the magnitude a of the acceleration occurring in the controller 7 indicates a magnitude which is larger than or equal to a threshold value, the CPU 30 determines that the player has started forward swing.

Here, a motion of the player character PC switching from backswing to forward swing, where the backswing angle Θback is a swing angle, will be described with reference to FIG. 20.

In FIG. 20, as described above, the backswing angle Θback indicates an angle of the arm of the player character PC, where a horizontal direction ahead of the player character PC is a reference direction. Specifically, when the player character PC expresses a motion of switching from backswing to forward swing, the ball B is swung by the backswing angle Θback backward from the reference direction.

The backswing angle Θback has a value obtained by repeatedly adding a swing change angle θ by repeatedly performing the process of step 53 as described above. The swing change angle θ is an angle which is calculated, depending on the magnitude of an acceleration detected by the acceleration sensor 701 of the controller 7, and an angle which is calculated, depending on a centrifugal force generated by the player swinging the controller 7. More specifically, the larger the centrifugal force occurring the controller 7, the larger the calculated swing change angle θ, and as a result, the larger the angle by which the ball B is swung up in a backward direction when backswing is switched to forward swing. In other words, the player character PC switches from backswing to forward swing by a swing-up angle depending on a motion of the player swinging the controller 7, and the swing-up angle of the player character PC varies depending on the magnitude of an acceleration which is detected by the acceleration sensor 701, depending on the swinging. Therefore, by swinging and moving the controller 7, the player can be given a sensation as if the player itself switched from backswing to forward swing.

Referring back to FIG. 10, after the backswing motion reproducing process/motion switching process in step 12, the CPU 30 sets the currently set backswing angle Θback to be a swing angle Θfor forward swing, and stores the swing angle Θfor into the forward swing angle data Df (step 13). In other words, the backswing angle Θback finally set in step 12 is an initial value of the swing angle Θfor forward swing. Next, the CPU 30 performs a forward swing motion reproducing process (step 14), and causes the process to go to the next step. Hereinafter, the forward swing motion reproducing process will be described with reference to FIG. 14.

In FIG. 14, the CPU 30 obtains acceleration data included in operational information received by the controller 7, and stores the obtained acceleration data as new acceleration data Da into the main memory 33 (step 61), and causes the process to go to the next step. Note that the process of step 61 is similar to that of step 20 and will not be described in detail.

Next, the CPU 30 calculates a swing change angle Θ, depending on the magnitude of an acceleration indicated by the acceleration data obtained in step 61 (step 62), and causes the process to go to the next step. For example, the CPU 30 calculates the magnitude a of the acceleration indicated by the acceleration data using expression (1) as in step 52, and stores the magnitude a of the acceleration into the acceleration magnitude data Db. Thereafter, the CPU 30 also calculates a swing change angle θ using expression (2) as in step 52, and stores the swing change angle θ into the swing change angle data Dd.

The CPU 30 calculates a forward swing angle Θfor using the swing change angle θ calculated instep 62 (step 63), and causes the process to go to the next step. For example, the CPU 30 references the forward swing angle Θfor stored in the forward swing angle data Df, and calculates Θfor−θ as a new forward swing angle Θfor. Thereafter, the CPU 30 updates the forward swing angle data Df with the new forward swing angle Θfor thus calculated.

Next, the CPU 30 references the forward swing angle Θfor stored in the forward swing angle data Df, and displays on the monitor 2 a motion of the player character PC performing forward swing at the forward swing angle Θfor as a swing angle (step 64), and ends the process of the subroutine. For example, the CPU 30 designates a forward swing state using basic motion data stored in the basic motion data Dh, and designates a swing angle Θ of the player character PC, thereby displaying a motion of forward swing at the forward swing angle Θfor as a swing angle. Hereinafter, the motion of the player character PC performing forward swing at the forward swing angle Θfor as a swing angle will be described with reference to FIG. 21.

In FIG. 21, assuming that a horizontal direction ahead of the player character PC is a reference direction, an angle from the reference direction of the arm of the player character PC swinging the ball B forward is a forward swing angle Θfor. In other words, the player character PC performs a motion of swinging the ball B forward at the forward swing angle Θfor from the reference direction. Note that the sign (the positive sign or the negative sign) of the forward swing angle Θfor is also changed at the reference direction as a boundary, as is similar to the initial angle Θst and the backswing angle Θback. In this example, a swing angle in a direction in which the player character PC performs forward swing from below the reference direction toward the reference direction is assumed to a positive angle Θ, and a swing angle in a direction in which the player character PC swings the ball 3 upward from the reference direction is assumed to be a negative angle Θ. Here, the forward swing angle Θfor may be calculated as a negative angle, and in this case, a forward swing motion may be displayed at a position where the ball B is swung up above the reference direction.

Also, the forward swing angle Θfor is a value obtained by subtracting a swing change angle θ in the process of step 63, and is decreased every time the process is repeated. The swing change angle θ which is an angle calculated, depending on the magnitude of an acceleration detected by the acceleration sensor 701 of the controller 7, and an angle which is calculated, depending on a centrifugal force generated by the player swinging the controller 7. More specifically, the larger the centrifugal force occurring in the controller 7, the larger the calculated swing change angle θ, and as a result, the larger the change angle of the forward swing angle Θfor. In other words, the player character PC performs forward swing, depending on a motion of the player swinging the controller 7. The swing speed of forward swing performed by the player character PC changes in real time, depending on the magnitude of an acceleration which is detected by the acceleration sensor 701, depending on swinging performed by the player. Therefore, by swinging and moving the controller 7, the player can be given a sensation as if the player itself swung the ball B forward.

Referring back to FIG. 10, after the forward swing motion reproducing process of step 14, the CPU 30 obtains key data included in operational information received from the controller 7, and determines whether or not the player has issued a release command (step 15). For example, when the operation button 72i is set to be a throw button, the CPU 30 obtains key data indicating an operation state of the operation button 72i and determines whether or not the operation button 72i has been pushed down. Thereafter, when a release command (e.g., release of the throw button in the pushed state, i.e., the pushed throw button is released) has been issued, the CPU 30 causes the process to go to the next step 16. On the other hand, when a release command has not been issued, the CPU 30 returns to step 14 and repeats the process of step 14.

Next, the CPU 30 sets the currently set forward swing angle Θfor to be a swing angle Θthrow for release of the ball B, and stores the swing angle Θthrow into the release swing angle data Dg (step 16). In other words, the forward swing angle Θfor set in step 14 when a release command has been issued is a swing angle Θthrow for release of the ball B.

Next, the CPU 30 performs a process of reproducing a motion of the player character PC releasing the ball B at the swing angle Θthrow (step 17), and causes the process to go to the next step. Hereinafter, the motion of the player character PC releasing the ball B at the swing angle Θthrow as a swing angle will be described with reference to FIG. 22.

In FIG. 22, the release swing angle Θthrow indicates an angle of the arm of the player character PC where a horizontal direction ahead of the player character PC is a reference direction. Specifically, when a motion of the player character PC releasing the ball B is expressed, the ball B is released in a throwing direction which faces downward at the release swing angle Θthrow from the reference direction.

Also, the forward swing angle Θfor has a value obtained by repeatedly subtracting a swing change angle θ by repeatedly performing the process of step 63 as described above, and the forward swing angle Θfor set when a release command is issued is a swing angle Θthrow. The swing change angle θ is an angle which is calculated, depending on the magnitude of an acceleration detected by the acceleration sensor 701 of the controller 7, and an angle which is calculated, depending on a centrifugal force generated by the player swinging the controller 7. More specifically, the larger the centrifugal force occurring in the controller 7, the larger the calculated swing change angle θ, and as a result, the smaller the swing angle Θthrow of the arm releasing the ball B even when a release command is issued with the same timing (i.e., the ball B is released at an upper position). Also, if the player delays issuance of a release command, the swing change angle θ is repeatedly subtracted during the delay time, so that the forward swing angle Θfor is further decreased. Therefore, the swing angle Θthrow of the arm releasing the ball B is decreased. In other words, the player character PC releases the ball B at a swing angle depending on the motion of the player swinging the controller 7 and timing of issuing a release command. A direction in which the player character PC releases the ball B changes in real time, depending on the magnitude of an acceleration which is detected by the acceleration sensor 701, depending on swinging performed by the player, or the timing of releasing the operation button 72i. Therefore, by swinging and moving the controller 7, the player can be given a sensation as if the player itself released the ball B.

Referring back to FIG. 10, the CPU 30 calculates a trajectory and a speed of the released ball B moving on a lane (step 18). Next, the CPU 30 displays on the monitor 2 movement of the ball B on the lane based on the trajectory and speed of the ball B calculated in step 18 (step 19), and ends the process of the flowchart.

For example, the CPU 30 calculates a speed of the moving ball B, depending on an average value of the magnitudes a of accelerations obtained in 5 frames before a release command. Also, the CPU 30 calculates how much the ball B curves on the lane, depending on a motion of the player turning the controller 7, to set a trajectory of the ball B. For example, the CPU 30 calculates a total of four accelerations Xa indicating a largest value of X-axis direction accelerations Xa stored in the X-axis direction acceleration data Da1 during 8 frames before and after a release command (a total of 16 frames), and calculates the degree of a curve of the ball B, depending on the total value. By these calculations, the ball B is moved, depending on the speed or turn of the controller 7 swung and moved by the player before and after a release command. Therefore, the player can be given a sensation as if the player itself threw the ball B.

Note that the direction in which the ball B curves on the lane, depending on the calculated degree of the curve can be variously set. For example, a ball trajectory may be set so that the ball B curves toward the first pin of the ten pins, which are targets in a bowling game. The direction of turn applied to the controller 7 may be calculated, depending on a direction of a centrifugal force occurring in the controller 7 which is analyzed based on the X, Y and Z-axis direction accelerations Xa, Ya and Za stored in the X-axis direction acceleration data Da1, the Y-axis direction acceleration data Da2, and the Z-axis direction acceleration data Da3, respectively. In this case, a ball trajectory can be set so that the ball B curves, depending on the calculated turn direction.

Thus, the game apparatus 3 of the embodiment can provide a novel game which sequentially reflects changes in acceleration detected by the acceleration sensor 701, depending on the swing motion of the player. For example, a motion of the player character PC throwing the ball B is displayed in real time based on swing angles Θ which sequentially reflect the acceleration varying over time, depending on the swing motion of the player. Therefore, the player can be given a sensation as if the player itself threw the ball B. Also, an angle (direction) at which the player character PC releases the ball B is determined by calculating a swing angle Θ when a release command is issued based on a result of accumulation of the accelerations varying over time, depending on the swing motion of the player, as appropriate. In other words, the swing angle of the controller 7 when a release command is issued is estimated using the accumulation of acceleration data, thereby making it possible to provide a novel game process which reflects the swing angle of the controller 7 calculated from the acceleration data. Also, the player character PC releases the ball B at a swing angle Θ when a release command is issued, which is calculated based on the result of accumulation of accelerations. Therefore, the player can be given a sensation as if the player itself released a ball.

Note that, in the above-described process of reproducing a throwing motion, the magnitude a of an acceleration occurring in the controller 7 is converted into a swing change angle θ, and the swing change angle θ is subjected to addition/subtraction as appropriate to calculate a swing angle Θ, thereby controlling reproduction of a motion. Alternatively, the reproduction control may be performed using other methods. For example, in an operation in which a throwing motion is previously defined, a speed at which the motion is reproduced may be calculated, depending on the magnitude a of an acceleration occurring in the controller 7, and depending on the reproduction speed, a speed at which basic motion data is reproduced may be controlled to display the throwing motion. Alternatively, a swing change angle θ obtained by converting the magnitude a of an acceleration occurring in the controller 7 may be used as the motion reproduction speed, and depending on the reproduction speed, the reproduction speed of the basic motion data may be controlled to display the throwing motion.

Although the swing angle Θ is set using the reference direction as a reference in the above description, other directions may be used as a reference direction. For example, a vertically upward or downward direction through the player character PC may be set as a reference direction. Also, in the above description, the sign of the swing angle Θ is changed at the reference direction as a boundary, and a swing angle in a direction in which the player character PC performs backswing downward from the reference direction is defined as a positive angle Θ. Alternatively, a swing angle in such a direction may be defined as a negative angle Θ. If the determination reference for a swing angle Θ, addition/subtraction of a swing change angle θ, or the like is changed, depending on a direction set as the reference direction and switching of the sign, the present invention can be achieved by a process similar to that which is described above.

Also, in the above description, reproduction of a motion of the player character PC is controlled based on the swing angle Θ of the player character PC, i.e., an angle of an arm of the player character PC. Alternatively, a motion of the player character PC may be controlled based on other parameters. For example, reproduction of a motion of the player character PC may be controlled by sequentially calculating positions in a virtual game world of the ball B held by the player character PC when the player character PC throws the ball B, depending on detected accelerations.

Also, in the above description, a bowling game has been described as an example so as to specifically describe the present invention. However, the present invention is not limited to the bowling game. The present invention can be applied to various games. For example, the present invention can be applied to a motion of the player character PC swinging a fishing rod to cast a terminal tackle in a fishing game, or a motion of the player character PC throwing a ball in a baseball game.

Also, in the above description, the game apparatus main body 5 which determines a motion of swinging the controller 7 is applied to the game system 1, as an example. Alternatively, the game apparatus main body 5 can be applied to an information processing apparatus, such as a general personal computer which is operated by an input device comprising an acceleration sensor, or the like. For example, various processes can be performed based on an acceleration occurring in the input device, including a control of a motion of an object displayed on the information processing apparatus, depending on acceleration data output from the acceleration sensor of the input device, and the like.

Also, the present embodiment can be achieved using an acceleration sensor which detects an acceleration only in a single axis. For example, the above-described swing motion can be determined using an acceleration sensor which detects and outputs only a Z-axis component (see FIGS. 3 and 4). In this case, when the controller 7 is held stationary, it is assumed that the controller 7 is held horizontally if a detected Z-axis direction acceleration is 0. A direction in which a gravitational acceleration acts is simply determined, depending on the magnitude of the Z-axis direction acceleration, thereby calculating an initial angle Θst. After the controller 7 is swung and moved, the magnitude of the Z-axis direction acceleration is processed in a manner similar to that for the magnitude a of the acceleration. In this case, the present invention can be achieved using an acceleration sensor which detects an acceleration only in a single axis, though a parameter, such as the magnitude of a curve of the ball B or the like, cannot be calculated.

Also, in the above description, the controller 7 and the game apparatus main body 5 are connected via radio communication. Alternatively, the controller 7 and the game apparatus main body 5 may be electrically connected via a cable. In this case, a cable connected to the controller 7 is connected to a connection terminal of the game apparatus main body 5.

The above-described shape of the controller 7, and the shapes, number, positions and the like of the operation sections 72 provided therein are only for illustrative purposes. Even in the case of other shapes, numbers and positions, the present invention can be achieved.

The game program of the present embodiment may be supplied to the game apparatus main body 5 not only via an external storage medium, such as the optical disc 4 or the like, but also via a wired or wireless communication line. The game program may be previously stored in a non-volatile storage device in the game apparatus main body 5. Note that examples of an information storage medium storing the game program may include a CD-ROM, a DVD, an optical disk-like storage medium similar thereto, and in addition, a non-volatile semiconductor memory.

The game apparatus of the present embodiment and the storage medium recording the game program of the present embodiment can perform a process, depending on a motion of swinging an input device comprising an acceleration sensor, and are useful as a game apparatus and a game program which operate a virtual object or the like, depending on a motion applied to a game controller or the like.

While the example embodiment presented herein has been described in detail, the foregoing description is in all aspects illustrative and not restrictive. It is understood that numerous other modifications and variations can be devised without departing from the scope of the embodiment.

What is claimed is:

1. A game apparatus configured to obtain operation data including acceleration data from an input device comprising an acceleration sensor for outputting the acceleration data, and based on the operation data, performing a game process, depending on an operation of swinging the input device, by moving the entire input device along a path, the apparatus comprising:

operation data obtaining programmed logic circuitry configured to obtain the operation data from the input device and storing the operation data into a storage memory;

initial state data calculating programmed logic circuitry configured to calculate initial state data indicating an attitude or a position of an object in a virtual game world using the acceleration data included in the operation data obtained at a start timing of the swinging of the entire input device along a path movement;

change amount data calculating programmed logic circuitry configured to calculate change amount data for sequentially changing the attitude or position of the object over time, depending on the acceleration data included in the operation data sequentially obtained on and after the start timing; and game processing programmed logic circuitry configured to change the attitude or position of the object, depending on the change amount data, the object being provided in the virtual game world, depending on the initial state data, to control a motion of the object toward a target, wherein said path movement is in a direction opposite to a target direction toward the target until the position of the input device reaches a back position, and wherein in response to said input device reaching the back position, said swinging of the entire input device is being in the target direction toward the target until the position of the input device corresponds to a predetermined motion of the object in the virtual game world occurring subsequently to the swinging motion, the game apparatus further comprising:

timing detecting programmed logic circuitry configured to detect timing with which the operation data indicating a content of a predetermined operation is obtained, on and after the start timing, wherein the game processing programmed logic circuitry sets at least a release direction of the object in the virtual game world toward the target, based on the change amount data calculated when the timing detecting programmed logic circuitry detects the timing with which the operation data indicating the content of the predetermined operation is obtained, so as to perform the game process to simulate release of the object and motion of the object in the release direction, wherein the input device comprises at least one operation key,
the operation data includes key data depending on pushing down of the operation key, and
the timing detecting programmed logic circuitry detects timing with which the operation key is pushed down or timing with which pushing down of the operation key is released, based on the key data.

2. The game apparatus according to claim 1, wherein the storage memory stores basic motion data indicating a series of motions of the object in the virtual game world,
the change amount data calculating programmed logic circuitry calculates the change amount data designating the attitude or position of the object during the series of motions indicated by the basic motion data, depending on magnitudes of accelerations indicated by the acceleration data sequentially obtained, and
the game processing programmed logic circuitry causes the object to move in accordance with the motions of the basic motion data based on the change amount data, starting from the attitude or position depending on the initial state data.

3. The game apparatus according to claim 1, wherein the storage memory stores basic motion data indicating a series of motions of the object in the virtual game world,
the change amount data calculating programmed logic circuitry calculates the change amount data designating a speed with which the series of motions indicated by the basic motion data are changed, depending on magnitudes of accelerations indicated by the acceleration data sequentially obtained, and
the game processing programmed logic circuitry reproduces the basic motion data, depending on the speed based on the change amount data, starting from the attitude or position depending on the initial state data.

4. The game apparatus according to claim 1, further comprising:
timing detecting programmed logic circuitry configured to detect timing with which the operation data indicating a content of a predetermined operation is obtained, on and after the start timing,
wherein the change amount data calculating programmed logic circuitry calculates the change amount data until the timing detecting means detects the timing with which the operation data indicating the content of the predetermined operation is obtained.

5. The game apparatus according to claim 4, wherein the input device comprises at least one operation key,
the operation data includes key data depending on pushing down of the operation key, and
the timing detecting programmed logic circuitry detects timing with which the operation key is pushed down or timing with which pushing down of the operation key is released, based on the key data.

6. The game apparatus according to claim 1, wherein, depending on a motion of the object, the game processing programmed logic circuitry performs a game process of moving another object in the virtual game world, and
the game processing programmed logic circuitry sets at least a direction in which the object moves the other object, based on the change amount data calculated when the timing detecting programmed logic circuitry detects the timing with which the operation data indicating the content of the predetermined operation is obtained, so as to perform the game process.

7. The game apparatus of claim 6, further comprising:
movement speed setting programmed logic circuitry configured to set a movement speed of the other object, depending on a magnitude of an acceleration indicated by the acceleration data obtained immediately before the timing detecting programmed logic circuitry detects the timing with which the operation data indicating the content of the predetermined operation is obtained.

8. The game apparatus according to claim 6, further comprising:
trajectory setting programmed logic circuitry configured to set a trajectory of the other object, depending on magnitudes of accelerations in a predetermined direction indicated by the acceleration data before and after the timing detecting programmed logic circuitry detects the timing with which the operation data indicating the content of the predetermined operation is obtained.

9. The game apparatus according to claim 1, wherein the initial state data calculating programmed logic circuitry includes:
determination programmed logic circuitry configured to determine whether or not an acceleration indicated by the acceleration data is stable;
acceleration direction calculating programmed logic circuitry configured to calculate a direction in which the acceleration acts on the input device when the determination means determines that the acceleration is stable; and
corresponding state calculating programmed logic circuitry configured to calculate the attitude or position of the object in the virtual game world corresponding to the direction in which the acceleration acts.

10. A game apparatus for obtaining operation data including acceleration data from an input device comprising an acceleration sensor for outputting the acceleration data, and based on the operation data, performing a game process, depending on an operation of swinging the input device, the apparatus comprising:
operation data obtaining programmed logic circuitry configured to obtain the operation data from the input device and storing the operation data into a storage memory;
initial state data calculating programmed logic circuitry configured to calculate initial state data indicating an attitude or a position of an object in a virtual game world using the acceleration data included in the operation data obtained at a start timing of the swinging of the entire input device;
change amount data calculating programmed logic circuitry configured to calculate change amount data for sequentially changing the attitude or position of the object over time, depending on the acceleration data included in the operation data sequentially obtained on and after the start timing; and
game processing programmed logic circuitry configured to change the attitude or position of the object, depending on the change amount data, the object being provided in the virtual game world, depending on the initial state data, to control a motion of the object, wherein
said path movement is in a direction opposite to a target direction until the position of the input device reaches a back position, and wherein
in response to said input device reaching the back position, said swinging of the entire input device is being in the target direction until the position of the input device corresponds to a predetermined motion of the object in the virtual game world occurring subsequently to the swinging motion, wherein the input device comprises at least one operation key,
the operation data includes key data depending on pushing down of the operation key, and the game apparatus further comprises:
- first timing detecting programmed logic circuitry for detecting first timing with which the operation key is pushed down, based on the key data;
- second timing detecting programmed logic circuitry for detecting second timing with which a magnitude of an acceleration indicated by the acceleration data sequentially obtained satisfies a predetermined condition, on and after the first timing; and
- third timing detecting programmed logic circuitry for detecting third timing with which pushing down of the operation key is released, based on the key data, on and after the second timing,
- wherein the initial state data calculating programmed logic circuitry calculates the initial state data using the acceleration data included in the operation data obtained with the first timing, and
- the change amount data calculating means includes:
  - first change amount data calculating programmed logic circuitry for calculating first change amount data for sequentially changing the attitude or position of the object over time so that the object performs a first motion, depending on the acceleration data included in the operation data sequentially obtained from the first timing to the second timing; and
  - second change amount data calculating programmed logic circuitry for calculating second change amount data for sequentially changing the attitude or position of the object over time so that the object performs a second motion different from the first motion, depending on the acceleration data included in the operation data sequentially obtained on and after the second timing,
  - wherein the game processing programmed logic circuitry performs a game process of controlling a motion of the object, depending on the second change amount data calculated with the third timing.

11. A non-transitory computer-readable physical storage medium having tangibly recorded thereon a game program executed by a computer in a game apparatus configured to obtain operation data including acceleration data from an input device comprising an acceleration sensor for outputting the acceleration data, performing a game process, depending on an operation of swinging the input device, by moving the entire input device along a path, the game program causing the computer to execute:
- operation data obtaining for obtaining the operation data from the input device and storing the operation data into a memory;
- initial state data calculating for calculating initial state data indicating an attitude or a position of an object in a virtual game world using the acceleration data included in the operation data obtained at a start timing of the swinging of the entire input device along a path movement;
- change amount data calculating for calculating change amount data for sequentially changing the attitude or position of the object over time, depending on the acceleration data included in the operation data sequentially obtained on and after the start timing;
- game processing for changing the attitude or position of the object, depending on the change amount data, the object being provided in the virtual game world, depending on the initial state data, to control a motion of the object toward a target, wherein
- said path movement is in a direction opposite to a target direction toward the target until the position of the input device reaches a back position, and wherein
- in response to said input device reaching the back position, said swinging of the entire input device is being in the target direction toward the target until the position of the input device corresponds to a predetermined motion of the object in the virtual game world occurring subsequently to the swinging motion, and
- timing detecting for detecting timing with which the operation data indicating a content of a predetermined operation is obtained, on and after the start timing,
- wherein the game processing sets at least a release direction of the object in the virtual game toward the target, based on the change amount data calculated when the timing detecting step detects the timing with which the operation data indicating the content of the predetermined operation is obtained, so as to perform the game process to simulate release of the object and motion of the object in the release direction, wherein
- the input device comprises at least one operation key,
- the operation data includes key data depending on pushing down of the operation key, and
- the timing detecting detects timing with which the operation key is pushed down or timing with which pushing down of the operation key is released, based on the key data.

12. The storage medium according to claim 11, wherein the memory stores basic motion data indicating a series of motions of the object in the virtual game world,
- the change amount data calculating calculates the change amount data designating the attitude or position of the object during the series of motions indicated by the basic motion data, depending on a magnitude of an acceleration indicated by the acceleration data sequentially obtained, and
- the game processing causes the object to move in accordance with the motions of the basic motion data based on the change amount data, starting from the attitude or position depending on the initial state data.

13. The storage medium according to claim 11, wherein the memory stores basic motion data indicating a series of motions of the object in the virtual game world,
- the change amount data calculating calculates the change amount data designating a speed with which the series of motions indicated by the basic motion data are changed, depending on a magnitude of an acceleration indicated by the acceleration data sequentially obtained, and
- the game processing reproduces the basic motion data, depending on the speed based on the change amount data, starting from the attitude or position depending on the initial state data.

14. The storage medium according to claim 11, wherein the game program causes the computer to further execute:
- timing detecting for detecting timing with which the operation data indicating a content of a predetermined operation is obtained, on and after the start timing,
- wherein the change amount data calculating calculates the change amount data until the timing detecting detects the timing with which the operation data indicating the content of the predetermined operation is obtained.

15. The storage medium according to claim 14, wherein the input device comprises at least one operation key,
- the operation data includes key data depending on pushing down of the operation key, and the timing detecting detects timing with which the operation key is pushed down or timing with which pushing down of the operation key is released, based on the key data.

16. The storage medium according to claim 11, wherein, depending on a motion of the object, the game processing performs a game process of moving another object in the virtual game world, and the game processing sets at least a direction in which the object moves the other object, based on the change amount data calculated when the timing detecting detects the timing with which the operation data indicating the content of the predetermined operation is obtained, so as to perform the game process.

17. The game apparatus of claim 16, wherein the game program causes the computer to further execute:

movement speed setting for setting a movement speed of the other object, depending on a magnitude of an acceleration indicated by the acceleration data obtained immediately before the timing detecting detects the timing with which the operation data indicating the content of the predetermined operation is obtained.

18. The storage medium according to claim 16, wherein the game program causes the computer to further execute:

trajectory setting for setting a trajectory of the other object, depending on magnitudes of accelerations in a predetermined direction indicated by the acceleration data before and after the timing detecting detects the timing with which the operation data indicating the content of the predetermined operation is obtained.

19. The storage medium according to claim 11, wherein the initial state data calculating step includes:

determination for determining whether or not an acceleration indicated by the acceleration data is stable;

acceleration direction calculating for calculating a direction in which the acceleration acts on the input device when the determination step determines that the acceleration is stable; and corresponding state calculating for calculating the attitude or position of the object in the virtual game world corresponding to the direction in which the acceleration acts.

20. A non-transitory computer-readable physical storage medium having tangibly recorded thereon a game program executed by a computer in a game apparatus for obtaining operation data including acceleration data from an input device comprising an acceleration sensor for outputting the acceleration data, performing a game process, depending on an operation of swinging the input device, the game program causing the computer to execute:

operation data obtaining for obtaining the operation data from the input device and storing the operation data into a memory;

initial state data calculating for calculating initial state data indicating an attitude or a position of an object in a virtual game world using the acceleration data included in the operation data obtained at a start timing of the swinging of the entire input device;

change amount data calculating for calculating change amount data for sequentially changing the attitude or position of the object over time, depending on the acceleration data included in the operation data sequentially obtained on and after the start timing; and game processing for changing the attitude or position of the object, depending on the change amount data, the object being provided in the virtual game world, depending on the initial state data, to control a motion of the object, wherein said path movement is in a direction opposite to a target direction until the position of the input device reaches a back position, and wherein in response to said input device reaching the back position, said swinging of the entire input device is being in the target direction until the position of the input device corresponds to a predetermined motion of the object in the virtual game world occurring subsequently to the swinging motion, wherein the input device comprises at least one operation key, the operation data includes key data depending on pushing down of the operation key, and the game program causes the computer to further execute:

first timing detecting for detecting first timing with which the operation key is pushed down, based on the key data;

second timing detecting for detecting second timing with which a magnitude of an acceleration indicated by the acceleration data sequentially obtained satisfies a predetermined condition, on and after the first timing; and third timing detecting for detecting third timing with which pushing down of the operation key is released, based on the key data, on and after the second timing, wherein the initial state data calculating calculates the initial state data using the acceleration data included in the operation data obtained with the first timing, and the change amount data calculating step includes:

first change amount data calculating for calculating first change amount data for sequentially changing the attitude or position of the object over time so that the object performs a first motion, depending on the acceleration data included in the operation data sequentially obtained from the first timing to the second timing; and second change amount data calculating for calculating second change amount data for sequentially changing the attitude or position of the object over time so that the object performs a second motion different from the first motion, depending on the acceleration data included in the operation data sequentially obtained on and after the second timing, wherein the game processing step performs a game process of controlling a motion of the object, depending on the second change amount data calculated with the third timing.

* * * * *